US009616375B2

(12) United States Patent
Wright et al.

(10) Patent No.: US 9,616,375 B2
(45) Date of Patent: *Apr. 11, 2017

(54) CAPTURE OF CARBON DIOXIDE (CO2) FROM AIR

(71) Applicant: Carbon Sink, Inc., Huntington, NY (US)

(72) Inventors: Allen B. Wright, Tucson, AZ (US); Klaus S. Lackner, Dobbs Ferry, NY (US); Ed Leon-Guerrero, Tucson, AZ (US); Ursula Ginster, Tucson, AZ (US); Tymothy Catterson, Tucson, AZ (US); Karl Madison, Tucson, AZ (US); Ryuhei Ishikawa, Tucson, AZ (US); George W. Grimm, Tucson, AZ (US); Mark Malcomson, Tucson, AZ (US); Ping Liu, Tucson, AZ (US)

(73) Assignee: Carbon Sink, Inc., Huntington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,559

(22) Filed: Jan. 24, 2014

(65) Prior Publication Data

US 2014/0370576 A1    Dec. 18, 2014

Related U.S. Application Data

(62) Division of application No. 12/596,642, filed as application No. PCT/US2008/060672 on Apr. 17, 2008, now Pat. No. 8,715,393.

(Continued)

(51) Int. Cl.
*B01D 53/02*     (2006.01)
*B01D 53/04*     (2006.01)

(52) U.S. Cl.
CPC ............ *B01D 53/025* (2013.01); *B01D 53/04* (2013.01); *B01D 2253/202* (2013.01);
(Continued)

(58) Field of Classification Search
CPC ........ B01D 2253/202; B01D 2253/206; B01D 2257/504; B01D 2259/40083;
(Continued)

(56) References Cited

U.S. PATENT DOCUMENTS

| 3,627,478 A | 1/1900 | Tepper |
| 1,031,799 A | 7/1912 | MacKay |

(Continued)

FOREIGN PATENT DOCUMENTS

| CA | 1212522 | 10/1986 |
| CA | 1236877 | 5/1988 |

(Continued)

OTHER PUBLICATIONS

Office action dated Feb. 25, 2015 for U.S. Appl. No. 13/550,691.

(Continued)

*Primary Examiner* — Christopher P Jones
(74) *Attorney, Agent, or Firm* — Wilson, Sonsini, Goodrich & Rosati

(57) ABSTRACT

Disclosed is a method for removing carbon dioxide from a gas stream, comprising placing the gas stream in contact with a resin, wetting the resin with water, collecting water vapor and carbon dioxide from the resin, and separating the carbon dioxide from the water vapor. The resin may be placed in a chamber or a plurality of chambers connected in series wherein the first chamber contains resin that was first contacted by the gas, and each successive chamber contains resin which has been wetted and carbon dioxide collected from for a greater period of time than the previous chamber, and so on, until the last chamber. Secondary sorbents may be (Continued)

employed to further separate the carbon dioxide from the water vapor.

11 Claims, 9 Drawing Sheets

Related U.S. Application Data

(60) Provisional application No. 60/912,379, filed on Apr. 17, 2007, provisional application No. 60/912,649, filed on Apr. 18, 2007, provisional application No. 60/946,954, filed on Jun. 28, 2007, provisional application No. 60/980,412, filed on Oct. 16, 2007, provisional application No. 60/985,596, filed on Nov. 5, 2007.

(52) U.S. Cl.
CPC .. *B01D 2253/206* (2013.01); *B01D 2257/504* (2013.01); *B01D 2259/40083* (2013.01); *Y02C 10/04* (2013.01); *Y02C 10/06* (2013.01); *Y02C 10/08* (2013.01)

(58) Field of Classification Search
CPC ...... B01D 53/025; B01D 53/04; Y02C 10/04; Y02C 10/06; Y02C 10/08
See application file for complete search history.

(56) References Cited

U.S. PATENT DOCUMENTS

| | | |
|---|---|---|
| 1,296,889 A | 3/1919 | White |
| 1,482,367 A | 1/1924 | Elledge |
| 2,718,454 A | 9/1955 | Wylie |
| 2,796,145 A | 6/1957 | King |
| 2,922,489 A | 1/1960 | Lee |
| 3,024,207 A | 3/1962 | Shaw et al. |
| 3,063,195 A | 11/1962 | Ravich |
| 3,111,485 A | 11/1963 | Kunin |
| 3,282,831 A | 11/1966 | Hamm |
| 3,294,488 A | 12/1966 | Dunlop et al. |
| 3,318,588 A | 5/1967 | Russell et al. |
| 3,330,750 A | 7/1967 | McRae et al. |
| 3,344,050 A | 9/1967 | Mayland et al. |
| 3,554,691 A | 6/1968 | Kuo et al. |
| 3,466,019 A | 9/1969 | Priestley |
| 3,466,138 A | 9/1969 | Spiegler et al. |
| 3,470,708 A | 10/1969 | Weil et al. |
| 3,489,506 A | 1/1970 | Galstaun et al. |
| 3,498,026 A | 3/1970 | Messinger et al. |
| 3,556,716 A | 1/1971 | Pollio et al. |
| 3,561,926 A | 2/1971 | McElroy |
| 3,594,989 A | 7/1971 | Bastiaans |
| 3,627,703 A | 12/1971 | Kojima |
| 3,632,519 A | 1/1972 | Gustafson |
| 3,645,072 A | 2/1972 | Clapham |
| 3,691,109 A | 9/1972 | Larsen |
| 3,710,778 A | 1/1973 | Cornelius |
| 3,712,025 A | 1/1973 | Wallace |
| 3,727,375 A | 4/1973 | Wallace |
| 3,833,710 A | 9/1974 | Deschamps et al. |
| 3,841,558 A | 10/1974 | Fowler et al. |
| 3,848,577 A | 11/1974 | Storandt |
| 3,855,001 A | 12/1974 | Cheron |
| 3,865,924 A | 2/1975 | Gidaspow et al. |
| 3,876,565 A | 4/1975 | Takashima et al. |
| 3,876,738 A | 4/1975 | Marinaccio et al. |
| 3,880,981 A | 4/1975 | Garingarao et al. |
| 3,891,411 A | 6/1975 | Meyer |
| 3,907,967 A | 9/1975 | Filss |
| 3,915,822 A | 10/1975 | Veltman |
| 3,948,627 A | 4/1976 | Schwarz et al. |
| 3,981,698 A | 9/1976 | Leppard |
| 4,012,206 A | 3/1977 | Macriss et al. |
| 4,047,894 A | 9/1977 | Kuhl |
| 4,138,850 A | 2/1979 | Tchernev |
| 4,140,602 A | 2/1979 | Lewis et al. |
| 4,167,551 A | 9/1979 | Tamura et al. |
| 4,197,421 A | 4/1980 | Steinberg |
| 4,238,305 A | 12/1980 | Gancy et al. |
| 4,239,515 A | 12/1980 | Yanagioka et al. |
| 4,246,241 A | 1/1981 | Mathur et al. |
| 4,249,317 A | 2/1981 | Murdock |
| 4,264,340 A | 4/1981 | Sircar et al. |
| 4,296,050 A | 10/1981 | Meier |
| 4,321,410 A | 3/1982 | Ono et al. |
| 4,336,227 A | 6/1982 | Koyama et al. |
| 4,340,480 A | 7/1982 | Pall et al. |
| 4,398,927 A | 8/1983 | Asher et al. |
| 4,409,006 A | 10/1983 | Mattia |
| 4,425,142 A | 1/1984 | Mann |
| 4,436,707 A | 3/1984 | Karwat |
| 4,475,448 A | 10/1984 | Shoaf et al. |
| 4,497,641 A | 2/1985 | Brown, Jr. et al. |
| 4,511,375 A | 4/1985 | BeVier |
| 4,528,248 A | 7/1985 | Galbraith et al. |
| 4,543,112 A | 9/1985 | Ackley et al. |
| 4,566,221 A | 1/1986 | Kossin |
| 4,569,150 A | 2/1986 | Carlson et al. |
| 4,592,817 A | 6/1986 | Chlanda et al. |
| 4,594,081 A | 6/1986 | Kroll et al. |
| 4,608,140 A | 8/1986 | Goldstein |
| 4,678,648 A | 7/1987 | Wynn |
| 4,711,097 A | 12/1987 | Besik |
| 4,711,645 A | 12/1987 | Kumar |
| 4,729,883 A | 3/1988 | Lam et al. |
| 4,735,603 A | 4/1988 | Goodson et al. |
| 4,770,777 A | 9/1988 | Steadly et al. |
| 4,804,522 A | 2/1989 | Hass |
| 4,810,266 A | 3/1989 | Zinnen et al. |
| 4,861,360 A | 8/1989 | Apffel |
| 4,869,894 A | 9/1989 | Wang et al. |
| 4,899,544 A | 2/1990 | Boyd |
| 4,906,263 A | 3/1990 | von Blucher et al. |
| 4,941,898 A | 7/1990 | Kimura |
| 4,946,620 A | 8/1990 | Kadono et al. |
| 4,953,544 A | 9/1990 | Hansen et al. |
| 4,957,519 A | 9/1990 | Chen |
| 4,980,098 A | 12/1990 | Connery |
| 5,069,688 A | 12/1991 | Wells |
| 5,070,664 A | 12/1991 | Groh et al. |
| 5,170,633 A | 12/1992 | Kaplan |
| 5,180,750 A | 1/1993 | Sugaya et al. |
| 5,203,411 A | 4/1993 | Dawe et al. |
| 5,215,662 A | 6/1993 | Johnson et al. |
| 5,232,474 A | 8/1993 | Jain |
| 5,253,682 A | 10/1993 | Hackette et al. |
| 5,277,915 A | 1/1994 | Provonchee et al. |
| 5,281,254 A | 1/1994 | Birbara et al. |
| 5,304,234 A | 4/1994 | Takatsuka et al. |
| 5,308,466 A | 5/1994 | Ganzi et al. |
| 5,316,637 A | 5/1994 | Ganzi et al. |
| 5,318,758 A | 6/1994 | Fujii et al. |
| 5,328,851 A | 7/1994 | Zaromb |
| 5,344,627 A | 9/1994 | Fujii et al. |
| 5,385,610 A | 1/1995 | Deerer et al. |
| 5,389,257 A | 2/1995 | Todd et al. |
| 5,401,475 A | 3/1995 | Ayala et al. |
| 5,409,508 A | 4/1995 | Erickson |
| 5,414,957 A | 5/1995 | Kenney |
| 5,443,740 A | 8/1995 | Schmitt |
| 5,454,189 A | 10/1995 | Graham et al. |
| 5,520,894 A | 5/1996 | Heesink et al. |
| 5,525,237 A | 6/1996 | Birbara et al. |
| 5,535,989 A | 7/1996 | Sen |
| 5,658,372 A | 8/1997 | Gadkaree |
| 5,659,974 A | 8/1997 | Graeff |
| 5,682,709 A | 11/1997 | Erickson |
| 5,711,770 A | 1/1998 | Malina |
| 5,747,042 A | 5/1998 | Choquet |
| 5,756,207 A | 5/1998 | Clough et al. |
| 5,779,767 A | 7/1998 | Golden et al. |
| 5,788,826 A | 8/1998 | Nyberg |

(56) References Cited

U.S. PATENT DOCUMENTS

| | | |
|---|---|---|
| 5,792,440 A | 8/1998 | Huege |
| 5,797,979 A | 8/1998 | Quinn |
| 5,833,747 A | 11/1998 | Bleakley et al. |
| 5,876,488 A | 3/1999 | Birbara et al. |
| 5,887,547 A | 3/1999 | Caveny et al. |
| 5,914,455 A | 6/1999 | Jain et al. |
| 5,917,136 A | 6/1999 | Gaffney et al. |
| 5,934,379 A | 8/1999 | Ostlyngen et al. |
| 5,955,043 A | 9/1999 | Neuman et al. |
| 5,962,545 A | 10/1999 | Chaudhary et al. |
| 5,972,080 A | 10/1999 | Nagata |
| 5,980,611 A | 11/1999 | Kumar et al. |
| 6,004,381 A | 12/1999 | Rohrbach et al. |
| 6,027,552 A | 2/2000 | Ruck et al. |
| 6,048,509 A | 4/2000 | Kawai et al. |
| 6,083,740 A | 7/2000 | Kodo et al. |
| 6,117,404 A | 9/2000 | Mimura et al. |
| 6,136,075 A | 10/2000 | Bragg et al. |
| 6,143,057 A | 11/2000 | Buelow et al. |
| 6,158,623 A | 12/2000 | Benavides et al. |
| 6,180,012 B1 | 1/2001 | Rongved |
| 6,200,543 B1 | 3/2001 | Allebach et al. |
| 6,209,256 B1 | 4/2001 | Brittin et al. |
| 6,214,303 B1 | 4/2001 | Hoke et al. |
| 6,221,225 B1 | 4/2001 | Mani |
| 6,228,145 B1 | 5/2001 | Falk-Pedersen et al. |
| 6,237,284 B1 | 5/2001 | Erickson |
| 6,279,576 B1 | 8/2001 | Lambert |
| 6,284,021 B1 | 9/2001 | Lu et al. |
| 6,306,803 B1 | 10/2001 | Tazaki |
| 6,316,668 B1 | 11/2001 | King et al. |
| 6,322,612 B1 | 11/2001 | Sircar et al. |
| 6,334,886 B1 | 1/2002 | Barnes, Jr. et al. |
| 6,364,938 B1 | 4/2002 | Birbara et al. |
| 6,402,819 B1 | 6/2002 | De Ruiter et al. |
| 6,500,236 B2 | 12/2002 | Suzuki et al. |
| 6,503,957 B1 | 1/2003 | Bernatowiez et al. |
| 6,526,699 B1 | 3/2003 | Foglio |
| 6,547,854 B1 | 4/2003 | Gray et al. |
| 6,565,627 B1 | 5/2003 | Golden et al. |
| 6,582,498 B1 | 6/2003 | Sass et al. |
| 6,617,014 B1 | 9/2003 | Thomson |
| 6,632,848 B2 | 10/2003 | Sugaya |
| 6,645,272 B2 | 11/2003 | Lemaire et al. |
| 6,716,888 B2 | 4/2004 | Bernatowicz et al. |
| 6,755,892 B2 | 6/2004 | Nalette et al. |
| 6,814,021 B1 | 11/2004 | Turkewitz et al. |
| 6,830,596 B1 | 12/2004 | Deckman et al. |
| 6,863,713 B1 | 3/2005 | Ghosal et al. |
| 6,890,497 B2 | 5/2005 | Rau et al. |
| 6,908,497 B1 | 6/2005 | Sirwardane |
| 6,969,466 B1 | 11/2005 | Starner |
| 7,067,456 B2 | 6/2006 | Fan et al. |
| 7,132,090 B2 | 11/2006 | Dziedzic et al. |
| 7,270,796 B2 | 9/2007 | Kemp et al. |
| 7,311,836 B2 | 12/2007 | Kusunose et al. |
| 7,343,341 B2 | 3/2008 | Sandor et al. |
| 7,364,608 B2 | 4/2008 | Tanahashi et al. |
| 7,384,621 B2 | 6/2008 | Stevens et al. |
| 7,415,418 B2 | 8/2008 | Zimmerman |
| 7,420,004 B2 | 9/2008 | Hardy et al. |
| 7,604,787 B2 | 10/2009 | Maroto-Valer et al. |
| 7,655,069 B2 | 2/2010 | Wright et al. |
| 7,699,909 B2 | 4/2010 | Lackner et al. |
| 7,708,806 B2 | 5/2010 | Wright et al. |
| 7,776,296 B2 | 8/2010 | Sarlis |
| 7,795,175 B2 | 9/2010 | Olah et al. |
| 7,833,328 B2 | 11/2010 | Lackner et al. |
| 7,993,432 B2 | 8/2011 | Wright et al. |
| 8,083,836 B2 | 12/2011 | Wright et al. |
| 8,088,197 B2 | 1/2012 | Wright et al. |
| 8,133,305 B2 | 3/2012 | Lackner et al. |
| 8,221,527 B1 | 7/2012 | Wright et al. |
| 8,246,723 B2 | 8/2012 | Wright et al. |
| 8,262,774 B2 | 9/2012 | Liu |
| 8,273,160 B2 | 9/2012 | Wright et al. |
| 8,337,589 B2 | 12/2012 | Wright et al. |
| 8,702,847 B2 | 4/2014 | Lackner et al. |
| 8,715,393 B2 | 5/2014 | Wright et al. |
| 8,999,279 B2 | 4/2015 | Wright et al. |
| 9,205,372 B2 | 12/2015 | Wright et al. |
| 9,266,051 B2 | 2/2016 | Wright et al. |
| 9,266,052 B2 | 2/2016 | Wright et al. |
| 2001/0004895 A1 | 6/2001 | Preiss |
| 2001/0009124 A1 | 7/2001 | Suzuki et al. |
| 2001/0022952 A1 | 9/2001 | Rau et al. |
| 2002/0083833 A1 | 7/2002 | Nalette et al. |
| 2002/0102674 A1 | 8/2002 | Anderson |
| 2002/0178925 A1 | 12/2002 | Mimura et al. |
| 2003/0022948 A1 | 1/2003 | Seiki et al. |
| 2003/0024686 A1 | 2/2003 | Ouellette |
| 2003/0041733 A1 | 3/2003 | Seguin et al. |
| 2003/0145726 A1 | 8/2003 | Gueret et al. |
| 2003/0167692 A1 | 9/2003 | Jewell et al. |
| 2003/0205692 A1 | 11/2003 | Fleming et al. |
| 2003/0220188 A1 | 11/2003 | Marand et al. |
| 2004/0031424 A1 | 2/2004 | Pope |
| 2004/0069144 A1 | 4/2004 | Wegeng et al. |
| 2004/0103831 A1 | 6/2004 | Pope |
| 2004/0134353 A1 | 7/2004 | Gillingham et al. |
| 2004/0195115 A1 | 10/2004 | Colombo |
| 2004/0213705 A1 | 10/2004 | Blencoe et al. |
| 2004/0219090 A1 | 11/2004 | Dziedzic et al. |
| 2005/0011770 A1 | 1/2005 | Katsuyoshi et al. |
| 2005/0063956 A1 | 3/2005 | Bernklau et al. |
| 2005/0092176 A1 | 5/2005 | Ding et al. |
| 2005/0095486 A1 | 5/2005 | Hamamoto et al. |
| 2005/0203327 A1* | 9/2005 | Jovanovic et al. .......... 585/820 |
| 2005/0204915 A1 | 9/2005 | Sammons et al. |
| 2005/0252215 A1 | 11/2005 | Beaumont |
| 2005/0269094 A1 | 12/2005 | Harris |
| 2005/0279095 A1 | 12/2005 | Goldman |
| 2006/0013963 A1 | 1/2006 | Thomson |
| 2006/0042209 A1 | 3/2006 | Dallas et al. |
| 2006/0051274 A1 | 3/2006 | Wright et al. |
| 2006/0150811 A1 | 7/2006 | Callahan et al. |
| 2006/0186562 A1 | 8/2006 | Wright et al. |
| 2006/0249020 A1 | 11/2006 | Tonkovich et al. |
| 2006/0289003 A1 | 12/2006 | Lackner et al. |
| 2007/0004023 A1 | 1/2007 | Trachtenberg |
| 2007/0089605 A1 | 4/2007 | Lampinen |
| 2007/0149398 A1 | 6/2007 | Jones et al. |
| 2007/0187247 A1 | 8/2007 | Lackner et al. |
| 2007/0199448 A1 | 8/2007 | Yates et al. |
| 2007/0217982 A1 | 9/2007 | Wright et al. |
| 2008/0008793 A1 | 1/2008 | Forsyth et al. |
| 2008/0025893 A1 | 1/2008 | Asprion et al. |
| 2008/0031801 A1 | 2/2008 | Lackner et al. |
| 2008/0087165 A1 | 4/2008 | Wright et al. |
| 2008/0276804 A1 | 11/2008 | Sayari et al. |
| 2008/0293976 A1 | 11/2008 | Olah et al. |
| 2009/0120288 A1 | 5/2009 | Lackner et al. |
| 2009/0130321 A1 | 5/2009 | Liu |
| 2009/0169452 A1 | 7/2009 | Constantz et al. |
| 2009/0232861 A1 | 9/2009 | Wright et al. |
| 2009/0294366 A1 | 12/2009 | Wright et al. |
| 2009/0320688 A1 | 12/2009 | Lackner et al. |
| 2010/0095842 A1 | 4/2010 | Lackner et al. |
| 2010/0105126 A1 | 4/2010 | Wright et al. |
| 2010/0116137 A1 | 5/2010 | Wright et al. |
| 2010/0319537 A1 | 12/2010 | Eisenberger et al. |
| 2011/0027157 A1 | 2/2011 | Wright et al. |
| 2011/0033357 A1 | 2/2011 | Wright et al. |
| 2011/0033358 A1 | 2/2011 | Wright et al. |
| 2011/0056382 A1 | 3/2011 | Lackner et al. |
| 2011/0079144 A1 | 4/2011 | Wright et al. |
| 2011/0079146 A1 | 4/2011 | Wright et al. |
| 2011/0079147 A1 | 4/2011 | Wright et al. |
| 2011/0081709 A1 | 4/2011 | Wright et al. |
| 2011/0081710 A1 | 4/2011 | Wright et al. |
| 2011/0081712 A1 | 4/2011 | Wright et al. |
| 2011/0083554 A1 | 4/2011 | Wright et al. |
| 2011/0108421 A1 | 5/2011 | Lackner et al. |
| 2011/0185897 A1 | 8/2011 | Wright et al. |

(56) References Cited

U.S. PATENT DOCUMENTS

| | | |
|---|---|---|
| 2011/0189075 A1 | 8/2011 | Wright et al. |
| 2011/0203174 A1 | 8/2011 | Lackner et al. |
| 2011/0203311 A1 | 8/2011 | Wright et al. |
| 2011/0206588 A1 | 8/2011 | Lackner et al. |
| 2011/0209614 A1 | 9/2011 | Wright et al. |
| 2011/0293503 A1 | 12/2011 | Wright et al. |
| 2012/0058032 A1 | 3/2012 | Lackner et al. |
| 2012/0220019 A1 | 8/2012 | Lackner et al. |
| 2012/0279397 A1 | 11/2012 | Wright et al. |
| 2012/0302469 A1 | 11/2012 | Lackner et al. |
| 2012/0304858 A1 | 12/2012 | Wright et al. |
| 2013/0115153 A1 | 5/2013 | Lackner et al. |
| 2013/0309756 A1 | 11/2013 | Wright et al. |
| 2013/0336722 A1 | 12/2013 | Wright et al. |
| 2013/0343981 A1 | 12/2013 | Wright et al. |
| 2015/0020683 A1 | 1/2015 | Wright et al. |
| 2015/0104554 A1 | 4/2015 | Wright et al. |
| 2015/0165373 A1 | 6/2015 | Lackner |

FOREIGN PATENT DOCUMENTS

| | | |
|---|---|---|
| CN | 1107078 A | 8/1995 |
| CN | 1391642 A | 1/2003 |
| DE | 4130837 A1 | 4/1992 |
| DE | 19521678 A1 | 6/1995 |
| DE | 19727295 A1 | 1/1999 |
| DE | 19830470 C1 | 11/1999 |
| DE | 20001385 U1 | 8/2000 |
| EP | 0020055 A1 | 12/1980 |
| EP | 0111911 A1 | 6/1984 |
| EP | 0254137 A1 | 1/1988 |
| EP | 0585898 | 9/1994 |
| FR | 2029424 | 10/1970 |
| GB | 1004046 | 9/1965 |
| GB | 1031799 | 6/1966 |
| GB | 1109439 | 4/1968 |
| GB | 1204781 | 9/1970 |
| GB | 1296889 | 11/1972 |
| GB | 1520110 | 10/1974 |
| GB | 2288143 A | 10/1995 |
| JP | 58-122022 A | 7/1983 |
| JP | 61-072035 A | 4/1986 |
| JP | 61 227822 A | 10/1986 |
| JP | 61-254220 A | 11/1986 |
| JP | 61-254221 | 11/1986 |
| JP | 61-280217 | 12/1986 |
| JP | 63-012323 A | 1/1988 |
| JP | 63-012324 A | 1/1988 |
| JP | 63-016032 A | 1/1988 |
| JP | 63-069525 A | 3/1988 |
| JP | 63-069527 A | 3/1988 |
| JP | 1208310 | 8/1989 |
| JP | 1305809 A | 12/1989 |
| JP | 2 187153 A | 7/1990 |
| JP | 3245811 A | 11/1991 |
| JP | 04171021 A | 6/1992 |
| JP | 04-200720 | 7/1992 |
| JP | 05-57182 | 3/1993 |
| JP | 06-071137 A | 3/1994 |
| JP | 06-253682 A | 9/1994 |
| JP | 9276648 A | 10/1997 |
| JP | 10-057745 | 3/1998 |
| JP | 2000-051634 | 2/2000 |
| JP | 2000-107895 | 4/2000 |
| JP | 2004-089770 | 3/2004 |
| JP | 2004-261757 | 9/2004 |
| JP | 2006-266583 A | 10/2006 |
| JP | 2006-340683 | 12/2006 |
| JP | 2007-190529 A | 8/2007 |
| JP | 2008-116193 A | 5/2008 |
| JP | 2011-516107 A | 5/2011 |
| KR | 2003-0012224 A | 2/2003 |
| RU | 2097115 C1 | 11/1997 |
| SU | 511963 A1 | 4/1976 |
| SU | 715120 A1 | 2/1980 |
| SU | 1828406 A3 | 7/1993 |
| WO | WO 94/13386 A1 | 6/1994 |
| WO | WO 98/16296 A1 | 4/1998 |
| WO | WO 98/17388 A1 | 4/1998 |
| WO | WO 98/22173 A1 | 5/1998 |
| WO | WO 00/50154 A1 | 8/2000 |
| WO | WO 00/76633 A1 | 12/2000 |
| WO | WO 01/21269 A2 | 3/2001 |
| WO | WO 01/51550 A1 | 7/2001 |
| WO | WO 01/21269 A3 | 8/2001 |
| WO | WO 2005/108297 A2 | 11/2005 |
| WO | WO 2005/108297 A3 | 1/2006 |
| WO | WO 2006/009600 A2 | 1/2006 |
| WO | WO 2006/009600 A3 | 4/2006 |
| WO | WO 2006/036396 A2 | 4/2006 |
| WO | WO 2006/036396 A3 | 8/2006 |
| WO | WO 2006/084008 A1 | 8/2006 |
| WO | WO 2007/016271 A2 | 2/2007 |
| WO | WO 2007/016274 A2 | 2/2007 |
| WO | WO 2007/016271 A3 | 3/2007 |
| WO | WO 2007/016274 A3 | 3/2007 |
| WO | WO 2007/114991 A2 | 10/2007 |
| WO | WO 2007/114991 A3 | 4/2008 |
| WO | WO 2008/042919 A2 | 4/2008 |
| WO | WO 2008/131132 A1 | 4/2008 |
| WO | WO 2008/061210 A2 | 5/2008 |
| WO | WO 2008/061210 A3 | 7/2008 |
| WO | WO 2009/149292 A1 | 12/2009 |
| WO | WO 2008/042919 A3 | 7/2010 |

OTHER PUBLICATIONS

Office action dated Mar. 6, 2015 for U.S. Appl. No. 13/733,227.
Office action dated Apr. 20, 2015 for U.S. Appl. No. 14/183,751.
U.S. Appl. No. 14/183,751, filed Feb. 19, 2014, Wright et al.
"An Industrial Sized Unit" Drawing and specification.
Abstracts of Eos. Trans. AGU, 82 (47), Fall Meeting 2001; pp. 3.
Abstracts of Eos. Trans. AGU, 83 (19), Spring Meeting 2002; pp. 3.
Abstracts of Eos. Trans. AGU, 83 (47), Fall Meeting 2002; pp. 3.
Astarita. Mass Transfer with Chemical Reaction. Amsterdam: Elsevier Publishing Company. 1967; 144-152.
Balster et al. Multi-Layer Spacer Geometries with Improved Mass Transport. Journal of membrane Science. 2006; 282:351-361.
Besra, et al. Particle Characteristics and Their Influence on Dewatering of Kaolin, Calcite and Quartz Suspensions. Int. J. Miner. Process. 2000; 59:89-122.
Bituin. New Findings May Redefine Renewable Energy Debate. Access Jun. 29, 2009. found at http://www.dailycal.org/article.php?id=8559.
Blok, et al. Hydrogen Production From Natural Gas, Sequestration of Recovered CO2 in Depleted Gas Wells and Enhanced Natural Gas Recovery. Energy. 1997; 22(2-3):161-168.
Boynton. Chemistry and Technology of Lime and Limestone. New York: Interscience Publishers. 1966; 204-206.
Canadian Official Action dated Jun. 21, 2011, Appin. No. 2,577,685.
Carbon Sequestration Could Be Employed Today to Help Alleviate Greenhouse Emissions. Accessed Jun. 29, 2009. found at http://www.earthinstitute.columbia.edu/news/2003/story06-25-03b.html.
Chinese office action dated Dec. 25, 2012 for CN Application 200780036850.5.
Chinese Official Action dated Apr. 28, 2011 Appin. No. 200780042511.8.
Chinese Official Action dated Dec. 3, 2010, Appln. No. 200780008015.
Chinese Official Action dated Jun. 13, 2011, Appln. No. 200780008015.0.
Chinese Official Action dated May 5, 2010 and Jan. 20, 2011, Application No. 200680030297.X.
Choi, et al. A new preparation for cation-exchange membrane using monomer sorption into reinforcing materials. Desalination. Mar. 22, 2002; 146:287-291.
Choi, et al. Characterization of LDPE/polystyrene cation exchange membranes prepared by monomer sorption and UV radiation polymerization. Journal of Membrane Science. 2003; 223:201-215.

(56) References Cited

OTHER PUBLICATIONS

Choi, et al. Preparation and characterization of LDPE/polyvinvylbenzyl trimethyl ammonium salts anion-exchange membrane. Journal of Membrane Science. 2003; 2001:219-231.

Cuiming, et al. Fundamental Studies of a New Hybrid (Inorganic-Organic) Positively Charged Membrane: Membrane Preparation and Characterizations. Journal of Membrane Science. 2003; 216:269-278.

Desideri, et al. Performance Modelling of a Carbon Dioxide Removal System for Power Plants. Energy Conversion and Management.1999; 40:1899-1915.

Dillon, et al. Oxy-Combustion Processes for CO2 Capture From Advanced Supercritical PF and NGCC Power Plant. Greenhouse Gas Control Technologies 7, Proceedings of the 7th International Conference on Greenhouse Gas Control Technologies Sep. 5, 2004, Vancouver, Canada. 211-220.

Dow Chemical Company, Dowex Type 1 Strong Base Anion Resin, 1998, http://www.inaqua.de/Prod/ion/pdf en/313 UPCORE Mono A625.pdf, p. 1.

Dubey et al. Chemical Extraction of Carbon Dioxide from Air to Sustain Fossil Energy by Avoiding Climate Change. 2nd Annual Conference on Carbon Sequestration, 2003.

Dubey et al., "Extraction of Carbon Dioxide from the Atmosphere Through Engineered Chemical Sinkage", Fuel Chemistry Division Preprints, 2002; pp. 1-4.

Dubey. Science for Sustainability: From Capturing Carbon Dioxide From Air to Environmental Impact of a Hydrogen Economy. Accessed Jun. 14, 2010. found at http://www.mbari.org/seminars/2003/spring2003/apr2_dubey.html.

Elliot, et al. Compensation of Atmospheric CO2 Buildup Through Engineered Chemical Sinkage. 2001; pp. 1-8.

European examination report dated Dec. 19, 2011 for EP Application No. 08746144.8.

European office action dated May 9, 2011 for EP Application No. 08746144.8.

European office action dated Jul. 4, 2011 for EP Application No. 07758183.3.

European official action dated Jan. 19, 2010 EP Application No. 05793918.3.

European Official Action, Serial No. 06 788 685.3-1213, dated Oct. 12, 2011 (3 pages).

European search report and opinion dated Jan. 7, 2011 for EP Application No. 07864483.8.

European search report and opinion dated Apr. 20, 2011 for EP Application No. 08746144.8.

European search report and opinion dated Jun. 22, 2010 for EP Application No. 07758183.3.

European search report and opinion dated Jul. 27, 2011 for EP Application No. 07853742.0.

European search report and opinion dated Oct. 16, 2009 for EP Application No. 06788685.3.

European search report and opinion dated Dec. 21, 2011 for EP Application No. 11008476.1.

Fuertes, et al. Carbon Composite Membranes from Matrimid and Kapton Polymides for Gas Separation. Microporous and Mesoporous Materials. 1999; 33:115-125.

Hanson, et al. Steam Drying and Fluidized-Bed Calcination of Lime Mud. Tappi Journal. 1993; 76(11):181-188.

Hashimoto, et al. Global CO2 recycling. Zairyo to Kankyo/Corrosion Engineering. 1996; 45(10):614-620. (Abstract only).

Hensel. In the Lab. Accessed Jun. 29, 2009. found at wvvw.eponline.comiarticles/53584.

Herzog, et al. Carbon Dioxide Recovery and Disposal From Large Energy Systems. Annu. Rev. Energy Environ. 1996; 21:145-166.

Huang, et al. Method to Regenerate Ammonia for the Capture of Carbon Dioxide. Energy and Fuels. 2002; 16:904-910.

Information About: David Keith. Access Sep. 26, 2005. found at http://ideas.respec.org/e/pke74.html.

Information on David Keith. Access Jun. 14, 2010. found at http://www.ucalgary.ca/-keith/.

International Preliminary Report on Patentability dated Jan. 16, 2008 for PCT/US2006/003646.

International Preliminary Report on Patentability dated Jan. 29, 2008 for PCT/US2006/029238.

International Preliminary Report on Patentability dated Feb. 15, 2011 for PCT/US2009/053461.

International Preliminary Report on Patentability dated Feb. 20, 2007 for PCT/US2005/029584.

International Preliminary Report on Patentability dated Mar. 3, 2011 for PCT/US2009/054795.

International Preliminary Report on Patentability dated May 11, 2010 for PCT/US2008/082505.

International Preliminary Report on Patentability dated May 25, 2010 for PCT/US2007/084237.

International Preliminary Report on Patentability dated May 28, 2009 for PCT/US2007/084880.

International Preliminary Report on Patentability dated Jun. 1, 2010 for PCT/US2007/80229.

International Preliminary Report on Patentability dated Sep. 9, 2008 for PCT/US2007/063607.

International Preliminary Report on Patentability dated Oct. 20, 2008 for PCT/US2008/060672.

International preliminary report on patentability dated Nov. 7, 2006 for PCT/US2005/015453.

International preliminary report on patentability dated Nov. 7, 2006 for PCT/US2005/015454.

International Preliminary Report on Patentability dated Dec. 6, 2010 for PCT/US2009/046306.

International search report and written opinion dated Nov. 15, 2005 for PCT/US2005/015453.

International search report and written opinion dated Dec. 21, 2005 for PCT/US2005/015454.

International Search report and Written Opinion dated Jan. 27, 2009 for PCT/US2008/084237.

International Search report and Written Opinion dated Jan. 30, 2007 for PCT/US2006/029238.

International Search report and Written Opinion dated Feb. 25, 2008 for PCT/US2007/063607.

International Search report and Written Opinion dated Mar. 6, 2008 for PCT/US2007/080229.

International Search report and Written Opinion dated Apr. 23, 2008 for PCT/US2007/084880.

International search report and written opinion dated May 12, 2009 for PCT/US2009/034554.

International search report and written opinion dated May 21, 2012 for PCT/US2009/053450.

International Search report and Written Opinion dated Jun. 27, 2006 for PCT/US2006/003646.

International search report and written opinion dated Aug. 30, 2007 for PCT/US2005/032848.

International Search report and Written Opinion dated Sep. 3, 2009 for PCT/US2009/046306.

International Search report and Written Opinion dated Sep. 15, 2008 for PCT/US2008/060672.

International Search report and Written Opinion dated Sep. 25, 2009 for PCT/US2009/053461.

International Search Report and Written Opinion dated Oct. 4, 2006 for PCT/US2005/029584.

International search report and written opinion dated Nov. 17, 2010 for PCT/US2010/043133.

International Search report and Written Opinion dated Dec. 9, 2009 for PCT/US2009/054795.

International Search report and Written Opinion dated Dec. 24, 2008 for PCT/US2008/082505.

International Search Report and Written Opinion dated Nov. 24, 2010 GCC/P/2007/9020.

Israel Official Action, Application Serial No. 25585/09, dated Jun. 30, 2011.

Japanese Official Action, Application Serial No. 2008-524154, dated Feb. 16, 2011, 4 pgs.

Japanese Official Action, Application Serial No. 2008-524154, dated May 31, 2011, 3 pgs.

(56) References Cited

OTHER PUBLICATIONS

Japanese Official Action, Application Serial No. 2009-531567, dated Feb. 7, 2011, 4 pgs.
Keith et al., "Climate Strategy with CO2 Capture from the Air" 2005; pp. 1-43.
Keith, et al. CO2 Capture From the Air: Technology Assessment and Implications for Climate Policy. pp. 1-6.
Keith, et al. Co2 Capture From the Air: Technology Assessment and Implications for Climate Policy. Greenhouse Gas Control Technologies 6. Proceedings of the 6th International Conference on Greenhouse Gas Control Technologies Oct. 1-4, 2002, Kyoto, Japan; 187-192.
Keith. The Carrot or the Stick: How to Build a Technology-Friendly Climate Policy in Canada. Climate Change Central Apr. 15, 2005, pp. 1-32.
Konno, et al. Crystallization of Aragonite in the Causticizing Reaction. Powder Technology. 2002; 123:33-39.
Korean office action dated Nov. 20, 2012 for KR Application 10-2008-7004729.
Lackner et al., "CO2 Extraction from Air" A White Paper from Los Alamos National Labs, The Reddy Corporation International, Sourcebook, Sep. 1999.
Lackner, et al. Carbon Dioxide Extraction from Air: Is It an Option?. Proceedings of the 24th Annual Technical Conference on Coal Utilization and Fuel Systems, 1999; pp. 885-896.
Lackner, et al. Carbon Dioxide Extraction from Air? Arguments 2001.pp. 1-5.
Lackner, et al. Free-Market Approaches to Controlling Carbon Dioxide Emissions to the Atmosphere: A Discussion of the scientific basis. Los Alamos National Laboratory (Lackner & Ziock) & Harvard University (Wilson), pps. 1-16.
Lackner, et al. The Case for Carbon Dioxide Extraction From Air. Sourcebook, Sep. 1999; vol. 57, No. 9, pp. 6-10.
Lackner, et al., "Capturing Carbon Dioxide From Air". First National Conference on Carbon Sequestrian. 2001; pp. 1-15.
Lackner. Can Fossil Carbon Fuel the $21^{st}$ Century? International Geology Review. 2002; 44:1122-1133.
Lackner. Extraction CO2 from the Air, Lackner presentation, 12 pages.
Liang, "Carbon Dioxide Capture From Flue Gas Using Regenerable Sodium-Based Sorbents", dated Aug. 1, 2003, Department of Chemical Engineering Thesis, (137 pgs).
Liu, et al. Composite Membranes from Photochemical Synthesis of Ultrathin Polymer Films. Nature vol. 352 Jul. 4, 1991.
Meier, et al. Design and Experimental Investigation of a Horizontal Rotary Reactor for the Solar Thermal Production of Lime. Energy. 2004; 29:811-821.
Mexican office action dated Oct. 29, 2012 for MX/a/2008/001054.
Mexican Official Action, Dated Feb. 2, 2011, Serial No. MX/a/2008/011464.
Mexican Official Action, Dated Jan. 24, 2011, Serial No. MX/a/2007/002019.
Mexican Official Action, Serial No. Mx/a/2007/002019, dated Aug. 31, 2011 (Mexico Attorney notified Attorney of record in instant application on Sep. 22, 2011) (2 pages).
Mexican Official Action, Serial No. MX/a/2009/003500, dated Oct. 12, 2011 (3 pages).
Mizutani. Structure of Ion Exchange Membranes. Journal of Membrane Science. 1990; 49:121-144.89.
Murdoch, et al. Sabatier Methanation Reactor for Space Exploration. (2005) A Collection of Technical Papers—$1^{st}$ Space Exploration Conference: Continuing the Voyage of Discovery, 2, pp. 981-987 (Abstract only).
Office action dated Jan. 25, 2011 for U.S. Appl. No. 11/227,660.
Office action dated Jan. 27, 2010 for U.S. Appl. No. 11/227,660.
Office action dated Feb. 1, 2011 for U.S. Appl. No. 11/209,962.
Office action dated Feb. 3, 2012 for U.S. Appl. No. 13/102,915.
Office action dated Feb. 4, 2010 for U.S. Appl. No. 12/555,874.
Office action dated Feb. 11, 2011 for U.S. Appl. No. 12/638,717.
Office action dated Feb. 23, 2010 for U.S. Appl. No. 11/209,962.
Office action dated Mar. 9, 2009 for U.S. Appl. No. 11/207,236.
Office action dated Mar. 11, 2011 for U.S. Appl. No. 12/903,962.
Office action dated Mar. 11, 2011 for U.S. Appl. No. 12/903,967.
Office action dated Mar. 11, 2011 for U.S. Appl. No. 12/903,970.
Office action dated Mar. 11, 2011 for U.S. Appl. No. 12/903,974.
Office action dated Mar. 11, 2011 for U.S. Appl. No. 12/903,981.
Office action dated Mar. 14, 2012 for U.S. Appl. No. 11/209,962.
Office action dated Mar. 15, 2010 for U.S. Appl. No. 11/683,824.
Office action dated Mar. 28, 2011 for U.S. Appl. No. 12/389,213.
Office action dated Mar. 30, 2009 for U.S. Appl. No. 11/346,522.
Office action dated Apr. 6, 2011 for U.S. Appl. No. 11/996,615.
Office action dated Apr. 13, 2012 for U.S. Appl. No. 13/102,901.
Office action dated May 4, 2012 for U.S. Appl. No. 13/295,950.
Office action dated May 26, 2011 for U.S. Appl. No. 11/209,962.
Office action dated Jun. 9, 2010 for U.S. Appl. No. 11/209,962.
Office action dated Jun. 17, 2009 for U.S. Appl. No. 11/346,522.
Office action dated Jun. 28, 2010 for U.S. Appl. No. 11/683,824.
Office action dated Jul. 1, 2011 for U.S. Appl. No. 13/102,915.
Office action dated Jul. 3, 2008 for U.S. Appl. No. 11/207,236.
Office action dated Jul. 3, 2012 for U.S. Appl. No. 13/102,901.
Office action dated Jul. 16, 2012 for U.S. Appl. No. 12/389,213.
Office action dated Aug. 1, 2011 for U.S. Appl. No. 12/903,974.
Office action dated Aug. 1, 2012 for U.S. Appl. No. 12/903,877.
Office action dated Aug. 3, 2011 for U.S. Appl. No. 12/903,962.
Office action dated Aug. 3, 2012 for U.S. Appl. No. 12/903,953.
Office action dated Aug. 8, 2012 for U.S. Appl. No. 12/903,873.
Office action dated Aug. 9, 2012 for U.S. Appl. No. 12/903,894.
Office action dated Aug. 10, 2012 for U.S. Appl. No. 12/903,886.
Office action dated Aug. 13, 2012 for U.S. Appl. No. 12/903,898.
Office action dated Aug. 27, 2010 for U.S. Appl. No. 11/209,962.
Office action dated Aug. 28, 2012 for U.S. Appl. No. 12/903,868.
Office action dated Aug. 30, 2012 for U.S. Appl. No. 12/903,958.
Office action dated Sep. 10, 2012 for U.S. Appl. No. 13/058,802.
Office action dated Sep. 11, 2009 for U.S. Appl. No. 11/209,962.
Office action dated Sep. 27, 2011 for U.S. Appl. No. 12/389,213.
Office action dated Sep. 27, 2011 for U.S. Appl. No. 13/102,915.
Office action dated Sep. 29, 2011 for U.S. Appl. No. 12/615,971.
Office action dated Oct. 1, 2009 for U.S. Appl. No. 11/227,660.
Office action dated Oct. 7, 2009 for U.S. Appl. No. 11/683,824.
Office action dated Oct. 7, 2010 for U.S. Appl. No. 11/227,660.
Office action dated Nov. 3, 2011 for U.S. Appl. No. 12/274,986.
Office action dated Nov. 9, 2010 for U.S. Appl. No. 12/638,717.
Office action dated Nov. 9, 2012 for U.S. Appl. No. 13/045,317.
Office action dated Nov. 10, 2010 for U.S. Appl. No. 11/996,615.
Office action dated Nov. 19, 2010 for U.S. Appl. No. 11/683,824.
Office action dated Dec. 1, 2011 for U.S. Appl. No. 13/102,901.
Office action dated Dec. 3, 2013 for U.S. Appl. No. 13/557,701.
Office action dated Dec. 7, 2012 for U.S. Appl. No. 13/295,950.
Office action dated Dec. 9, 2013 for U.S. Appl. No. 13/550,691.
Office action dated Dec. 12, 2013 for U.S. Appl. No. 13/733,227.
Office action dated Dec. 20, 2012 for U.S. Appl. No. 11/209,962.
Official Action issued in Applicants' counterpart Chinese Patent Application Serial No. 200680003905.8 dated Jun. 12, 2009.
Official Action issued in Applicants' counterpart Russian Patent Application Serial No. 2008139902 (051576) dated Feb. 4, 2011.
Official Action issued in Applicants' counterpart Russian Patent Application Serial No. 2008139902 dated Nov. 19, 2010.
Official Action issued in Applicants' counterpart Russian Patent Application Serial No. 2009116621/05 (022802) dated Jun. 1, 2011.
Official Action received in Applicants' related Australian Patent Application Serial No. 2005290082 dated Apr. 20, 2007.
Official Action received in Applicants' related Australian Patent Application Serial No. 2005290082 dated Mar. 5, 2010.
Official Action received in Applicants' related Australian Patent Application Serial No. 2005290082 dated Apr. 13, 2010.
Official Action received in Applicants' related Australian Patent Application Serial No. 2005290082 dated May 20, 2010.
Official Action received in Applicants' related Australian Patent Application Serial No. 2005290082 dated Jul. 22, 2010.
Official Action received in Applicants' related Australian Patent Application Serial No. 2007233275 dated Jan. 14, 2011.
Official Action received in Applicants' related Australian Patent Application Serial No. 2007303240 dated Feb. 9, 2011.

(56) References Cited

OTHER PUBLICATIONS

Official Action received in Applicants' related Australian Patent Application Serial No. 2010241388 dated Jul. 7, 2011.
Official Action received in Applicants' related Australian Patent Application Serial No. 2007319211 dated Jun. 17, 2011.
Official Action received in Applicants' related Australian Patent Application Serial No. 2007233275 dated Jun. 1, 2011.
Official Action received in Applicants' related Mexican Patent Application Serial No. MX/a/2007/009081, dated Jul. 18, 2011.
Official Action received in Applicants' related New Zealand Patent Application Serial No. 575870 dated Mar. 17, 2011 and Nov. 11, 2010.
Official Action received in Applicants' related New Zealand Patent Application Serial No. 575870 dated Jun. 27, 2011.
Official Action received in related Australian Patent Application Serial No. 2006210619 dated Mar. 1, 2010.
Olsson, et al. Thermophysical Properties of Aqueous NaOH-H20 Solutions at High Concentrations. International Journal of Thermophysics. 1997; 18(3):779-793.
Researchers Explore Extracting CO2 Directly From Air. Apr. 15, 2002. found at http://www.earthvision.net/ColdFusion/News Page1.cfm?NewsID=20309.
Resume of David Keith, Academic CV, Spring 2005, 8 pgs.
Rickman. Imagine No Restriction on Fossil-Fuel Usage and No Global Warming! Accessed Jun. 29, 2009. found at http://www.lanl.govinews/releases/archive/02-028.shtml.
Russian office action dated Jan. 5, 2013 for RU Application 2008139902.
Russian Official Action + Translation, dated Feb. 11, 2010, Appin. No. 2007132880/15, (13 pgs).
Russian Official Action + Translation, dated Feb. 2, 2006, Appin. No. 2007132880/15.
Russian Official Action + Translation, dated Sep. 15, 2010 Appin. No. 2007132880/15.
Russian Official Action, Serial No. 2008139902/15, dated Jul. 20, 2011 (Russian Attorney notified Attorney of record in instant application on Sep. 15, 2011) (6 pages).
Russian Official Action, Serial No. 200914222/05, dated Sep. 30, 2011 (9 pages).
Sata, et al. Modification of Properties of Ion Exchange Membranes. VI. Electrodialytic Transport Properties of Cation Exchange Membranes with a Electrodeposition Layer of Cationic Polyelectrolytes. 1979, pp. 1199-1213.
Sata, et al. Modification of Properties of Ion Exchange Membranes. VII. Relative Transport Numbers between Various Cations of Cation Exchange Membrane Having Cationic Polyelectrolyte Layer and Mechanism of Selective Permeation of Particular Cations. 1979, pp. 2071-2085.
Sata. Modification of Properties of Ion Exchange Membranes. IV. Change of Transport Properties of Cation-Exchange Membranes by Various Polyelectrolytes. 1978, pp. 10631080.
Sata. Monovalent Cation Permselective Exchange Membrane. Apr. 15, 1972, pp. 980-982.
Singer. Americans Believe in Global Warming . . . and Psychic Powers, Astrology, and UFO's. Accessed Jun. 29, 2009. Environment & Climate News, 2002; vol. 5, No. 7. found at http://heartland.org/.
Singh. Technical Note Ultrasonically Assisted Rapid Solid-Liquid Separation of Fine Clean Coal Particles. Minerals Engineering. 1999; 12(4):437-443.
Snowpure, LLC, SnowPure Excellion Product Information and Brochure. Aug. 2009.
Strieber. New Solutions to Oil Problems, Whitley Strieber's Unknown Country, 2002, found at http://www.unknowncountry.com/news/print.phtml?id=1467.
Sun et al., "CO2 sorption in activated carbon in the presence of water", dated Feb. 9, 2007, Science Direct, Chemical Physics Letterse 437 (2000) (abstract enclosed).
US Notice of Allowance, U.S. Appl. No. 12/265,556, dated Nov. 7, 2011 (33 pages).
US Official Action, U.S. Appl. No. 11/209,962, dated Oct. 6, 2011 (24 pages).
US Official Action, U.S. Appl. No. 13/208,156, dated Oct. 26, 2011 (21 pages).
Weber, et al. The absorption of carbon dioxide by weak base ion exchange resins. Aiche Journal. Jul. 1970; 609-614. http://onlinelibrary.wiley.com/doi/10.1002/aic.690160417/pdf.
White, et al. Separation and capture of CO2 from large stationary sources and sequestration in geological formations—coalbeds and deep saline aquifers. J Air Waste Manag Assoc. Jun. 2003;53(6):645-715.
Written Public Comments on the Strategic Plan for the U.S. Climate Change Science Program, General Comments. 2003, pp. 1-160.
Yin, et al., "Absorption and steam desorption performance of weak base anion exchange resin" (1995) Hangtian Yixue Yu Yixue Gongcheng/Space Medicine and Medical Engineering, 8 (1), pp. 27-31. (Abstract only).
Zeman, et al. Capturing carbon dioxide directly from the atmosphere. World resource review. 2004; 16(2):157-172.
Zsako, et al Use of Thermal Analysis in the Study of Sodium Carbonate Causticization by Means of Dolomitic Lime. Journal of Thermal Analysis. 1998; 53:323-331.
Office action dated Jan. 28, 2014 for U.S. Appl. No. 13/386,587.
Office action dated Jan. 29, 2014 for U.S. Appl. No. 12/996,589.
U.S. Appl. No. 14/542,120, filed Nov. 14, 2014, Wright et al.
U.S. Appl. No. 14/561,831, filed Dec. 5, 2014, Wright et al.
U.S. Appl. No. 14/621,931, filed Feb. 13, 2015, Wright et al.
Office action dated Dec. 18, 2014 for U.S. Appl. No. 13/058,812.
U.S. Appl. No. 14/444,882, filed Jul. 28, 2014, Lackner.
Avgul, et al. Adsorption of acid gases by macroporous, weekly basic anion exchange resins with different functional groups. Colloid Journal of the USSR. A translation of Kolloidnyi Zhurnal. 1982; 43(6):837-842.
Belyakova, et al. Adsorption of carbon dioxide and water by macroporous anion-exchange resins. Colloid Journal of the USSR. A translation of Kolloidnyi Zhurnal. 1975; 37(3):484-487.
Notice of allowance dated Aug. 25, 2014 for U.S. Appl. No. 13/733,227.
Office action dated Jun. 26, 2014 for U.S. Appl. No. 13/733,227.
Office action dated Aug. 7, 2014 for U.S. Appl. No. 13/557,701.
Office action dated Aug. 15, 2014 for U.S. Appl. No. 13/550,691.
Otsuji, et al. A regenerable carbon dioxide removal and oxygen recovery system for the Japanese Experiment Module. Acta Astronaut. Jan. 1987;15(1):45-54.
Steinberg, et al. Synthetic carbonaceous fuel and feedstock using nuclear power, air and water. International Journal of Hydrogen Energy. 1977; 2:189-207.
Weimer, et al. CO2 removal and fixation solar high temperature syngas generation for fuel synthesis. Energy Conyers. Mgmt. 1997; 38:S379-S384.
U.S. Appl. No. 14/257,698, filed Apr. 21, 2014, Wright et al.
European search report dated Feb. 28, 2014 for EP Application No. 13175213.1.
U.S. Appl. No. 14/843,700, filed Sep. 2, 2015, Wright et al.
U.S. Appl. No. 14/873,484, filed Oct. 2, 2015, Wright et al.
Notice of allowance dated Oct. 6, 2015 for U.S. Appl. No. 14/183,751.
Notice of allowance dated Oct. 15, 2015 for U.S. Appl. No. 13/733,227.
U.S. Appl. No. 14/986,830, filed Jan. 4, 2016, Wright et al.
Office action dated Jan. 29, 2016 for U.S. Appl. No. 14/444,882.
Office action dated Dec. 8, 2015 for U.S. Appl. No. 14/561,831.
Notice of allowance dated Aug. 10, 2016 for U.S. Appl. No. 14/561,831.
Office action dated Nov. 3, 2016 for U.S. Appl. No. 13/058,812.
U.S. Appl. No. 15/046,621, filed Feb. 18, 2016, Wright et al.
U.S. Appl. No. 15/133,513, filed Feb. 20, 2016, Wright et al.
U.S. Appl. No. 15/243,806, filed Aug. 22, 2016, Wright et al.
Office action dated Mar. 18, 2016 for U.S. Appl. No. 13/058,812.
Office action dated Dec. 2, 2016 for U.S. Appl. No. 15/243,806.

\* cited by examiner

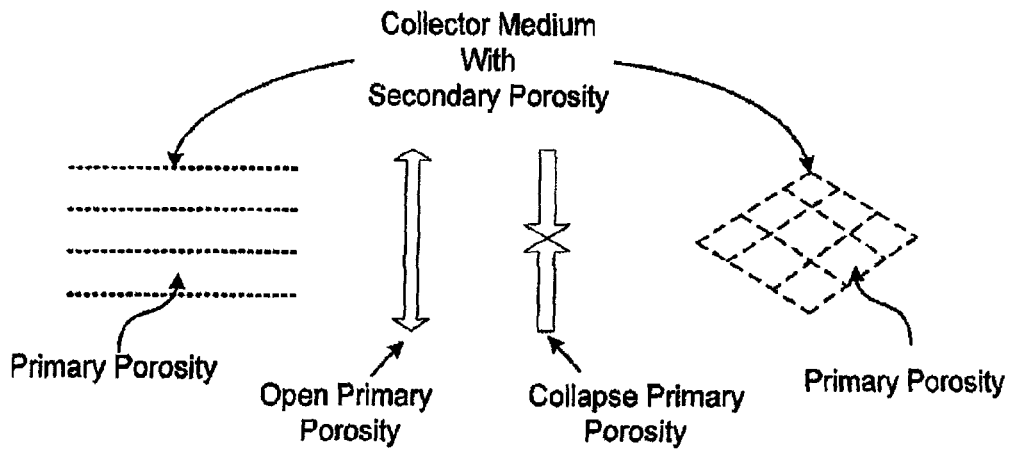
FIG. 11A  FIG. 11B
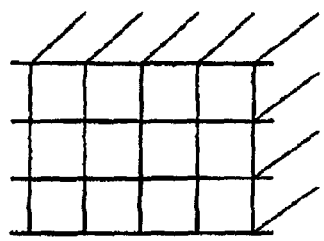 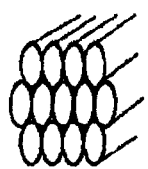 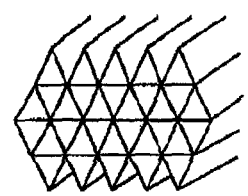
FIG. 12A  FIG. 12B  FIG. 12C
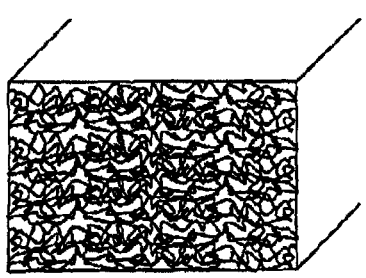 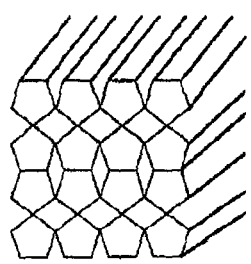 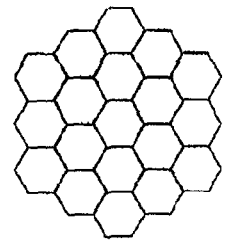
FIG. 12D  FIG. 12E  FIG. 12F

CAPTURE OF CARBON DIOXIDE (CO2) FROM AIR

The present invention relates to a method and apparatus for removal of selected gases from air. The invention has particular utility for the extraction of carbon dioxide ($CO_2$) from air and will be described in connection with such utilities, although other utilities are contemplated.

There is compelling evidence to suggest that there is a strong correlation between the sharply increasing levels of atmospheric $CO_2$ with a commensurate increase in global surface temperatures. This effect is commonly known as Global Warming. Of the various sources of the $CO_2$ emissions, there are a vast number of small, widely distributed emitters that are impractical to mitigate at the source. Additionally, large scale emitters such as hydrocarbon-fueled power plants are not fully protected from exhausting $CO_2$ into the atmosphere. Combined, these major sources, as well as others, have lead to the creation of a sharply increasing rate of atmospheric $CO_2$ concentration. Until all emitters are corrected at their source, other technologies are required to capture the increasing, albeit relatively low, background levels of atmospheric $CO_2$. Efforts are underway to augment existing emissions reducing technologies as well as the development of new and novel techniques for the direct capture of ambient $CO_2$. These efforts require methodologies to manage the resulting concentrated waste streams of $CO_2$ in such a manner as to prevent its reintroduction to the atmosphere.

The production of $CO_2$ occurs in a variety of industrial applications such as the generation of electricity power plants from coal and in the use of hydrocarbons that are typically the main components of fuels that are combusted in combustion devices, such as engines. Exhaust gas discharged from such combustion devices contains $CO_2$ gas, which at present is simply released to the atmosphere. However, as greenhouse gas concerns mount, $CO_2$ emissions from all sources will have to be curtailed. For mobile sources the best option is likely to be the collection of $CO_2$ directly from the air rather than from the mobile combustion device in a car or an airplane. The advantage of removing $CO_2$ from air is that it eliminates the need for storing $CO_2$ on the mobile device.

Extracting carbon dioxide ($CO_2$) from ambient air would make it possible to use carbon-based fuels and deal with the associated greenhouse gas emissions after the fact. Since $CO_2$ is neither poisonous nor harmful in parts per million quantities, but creates environmental problems simply by accumulating in the atmosphere, it is possible to remove $CO_2$ from air in order to compensate for equally sized emissions elsewhere and at different times.

Most prior art methods, however, result in the inefficient capture of $CO_2$ from air because these processes heat or cool the air, or change the pressure of the air by substantial amounts. As a result, the net reduction in atmospheric levels of $CO_2$ is negligible as the cleaning process may introduce $CO_2$ into the atmosphere as a byproduct of the generation of electricity used to power the process.

In our aforesaid parent applications, we describe the use of functionalized ion exchange resins for extracting $CO_2$ from ambient air. In particular, in our aforesaid '326 application we describe the use of strong base ion exchange resins that have a strong humidity function, that is, an ion exchange resin having the ability to take up $CO_2$ as humidity is decreased, and give up $CO_2$ as humidity is increased. The present invention provides improvements in air capture devices using ion exchange resins (IER).

As used herein the term ion exchange refers to a reversible process in which ions are released from an insoluble solid phase material in exchange for other ions in a surrounding solution; for purposes of this discussion this term applies even if the hydration of the ion exchange resin is so minimal that there is no visible moisture on the ion exchange resin and therefore the water content would in general not be considered to constitute a solution.

In the following we also will consider wetting the ion exchange resin. The term "wetting" will refer to exposing the resin to liquid water or to enhanced levels of water vapor pressures. Enhanced vapor pressures, unless explicitly specified otherwise, refers to water vapor partial pressures that exceed those to which the resin was exposed earlier, for example when it collected $CO_2$.

Common commercially available ion exchange resins are made up of a polystyrene or cellulose based backbone which is aminated into the anionic form usually via chloromethalation. Once the amine group is covalently attached, it is now able to act as an ion exchange site using its ionic attributes. However, there are other ion-exchange materials and these could also be used for collection of $CO_2$ from the atmosphere.

Depending on the preparation technique, the resin can be manipulated to have specific properties, and it is one goal of this invention to engineer the resin to have particular properties that are suitable for particular applications. One important measure of control is the degree of crosslinking between strands of polymers. The crosslinking shown in FIG. 2 is a way of connecting two polymers strands through a common covalent bond. This is done by sharing a benzene ring between two crosslinked strands.

In an ion exchange resin, the degree of crosslinking dictates the resin's water retention ability. Because of the ionic nature of the resin, water has a high affinity to the ions balancing out the attached charges and in doing so the water is attracted to the resin. The amount of water that is in equilibrium with the resin is what dictates the relative concentrations of the ionic salts contained within the resin. The effective pH in turn can control the reaction kinetics for absorbing $CO_2$.

The degree to which the polymer is functionalized can be controlled by varying the concentrations of reactants during chloromethalation and in turn through amination in which the amine is covalently bonded. The number of functional groups per volume determines the storage capacity of the resin. Of course with more amine group sites more ions can be stored; on the other hand if there are too many sites the Coulombic forces within the resin may not allow many ions to pass. Steric hindrance in more tightly bound resins may also play a role in the types of atoms that can be exchanged.

The type of amine group is also a customizable attribute. The moiety that is attached can be a simple chemical such as ammonia or a complex molecule such as a 2-amino-dipropanolamine, etc. By substituting hydrogen ions in the amine group with other organic chains, one can largely determine the basicity of the ionic groups attached to the resin. The mobility of anions acting as counter charges to the attached amine cations also will affect the $CO_2$ absorption kinetics of the resin. For example, a small anion, such as a $Cl^-$ or an $OH^-$, is normally very mobile within a resin even if there are many sub groups attached to the nitrogen atom, whereas a large anion, such as $CO_3^=$ or $NO_3^=$, is relatively immobile and is more readily immobilized by the addition of organic subgroups to the amine group.

The type of amine that is attached to the resin greatly affects the degree of ionic disassociation the amine may undergo. A nitrogen atom is able to form three covalent bonds but as a positive ion it can form a fourth covalent bond. Ammonia and water react to form ammonium hydroxide, $NH_3+H_2O \leftarrow \rightarrow NH_4^+OH^-$. However ammonia is a weak base, as the equilibrium is far to the side of $NH_3$. When the ammonia is attached to a polymer backbone however, the degree to which the equilibrium is shifted can be manipulated. In the case of R—$NH_2$ the amine group can exist in the neutral state R—$NH_2$ or can form a cationic site of the form R—$NH_3^+$. The degree to which the site is charged will depend on the choice of R. Furthermore it is possible to substitute for several of the hydrogen atoms in the molecule and thereby change the degree of ionization. An extreme case is the one where four organic residues are attached to the nitrogen atom—creating a quaternary ammonium—leaving it permanently in a positively charged state. In a sense, the nitrogen can no longer participate in its equilibrium shift back to ammonia $NH_3$ due to the fact that all four bonds are fully utilized and tied to the polymer matrix. Since the hydroxide ion only associates as an ion with the positive charge site of a quaternary ammonium, the resulting base is completely disassociated. Hence the quaternary amine resin is known as a strong base resin. When the ammonium is allowed to undergo complete disassociation, it acts like any other strong base such as NaOH. The ammonium doesn't need to be attached to a solid polymer to undergo complete disassociation as is the case of tetramethyl-ammonium-hydroxide or a series of other fully disassociated organic liquids. These compounds are considered equivalent to strong earth metal bases, and some of these ionic liquids are observed to be strong absorbers of $CO_2$. It is therefore possible to use many such ionic liquids as sorbents that can remove $CO_2$ from the air.

As can be seen from the discussion above, the degree to which the amine group can act as a base can also be controlled by the types of groups that are attached to the nitrogen. Just as a strong base can be produced by filling all the available reaction sites with carbon groups, a weak base can be controlled by limiting the groups which are attached.

Direct application of ion exchange resins (IER) has shown interesting attributes such as high water affinity and an internal ion circulation mechanism. The value of this property for $CO_2$ capture is the ability to create an effective $OH^-$ surface without the need for continuous wetting. Not only can we create an active $OH^-$ surface but we can also control the pH of the surface using the above characteristics. Furthermore we have shown that the $CO_2$ absorption depends on the water content of the resin matrix.

The ability to create a solid surface that acts like a strong base solution has several advantages not limited to the following:

1. Safety: Since the $OH^-$ functionality is attached to a solid surface, it is not able to travel or migrate and can only be removed by replacement. Thus there is no danger of the strong base chemical being inadvertently released into the environment. There also is no free liquid available to form aerosols in the processed air stream that could be carried into the environment. In fact, resin manufactures consider the IER to be completely benign unless in contact with strong oxidizers.
2. Environmental by-products elimination: Due to the fact that the collector is contacted by extremely large volumes of air, air collectors are likely to collect dust, pollen and other impurities from the air. For a gas-liquid contacting configuration, this is problematic. Upstream filtration of the incoming air or additional filtration in the downstream separation process would be required to remove the contaminants and add costs. Since the solid Off surface exclusively bonds with anions ionically, the solid surface readily can be washed of contaminants such as dirt and debris without affecting the surface and the captured anions. The wash solution, typically potable water, then can be safely disposed of without subsequent treatment due to the fact that no solids or chemicals are dissolved in the solution. Essentially, it is like washing dirt out of a plastic mesh.
3. Structure: Since most polymers can be aminated, the direct application of the amine functionality to structurally stable surfaces can provide not only a contact surface but also can act as a de facto collector. This simplifies the mechanical design, lowers manufacturing costs and expedites assembly.
4. Ion flow dynamics: Experiments have shown ion exchange resins to contain an internal surface regeneration mechanism. Without wishing to be bound by theory, this is likely due to water retention within the resin and the ionic concentration gradients that are established upon contact with the air. When an $OH^-$ surface contacts a stream containing $CO_2$, the acid-base reaction between $H^+$ and $OH^-$ produces water leaving behind an $HCO_3^-$ group in place of the $OH^-$ on the resin. Due to the fact that there are multiple levels of $OH^-$ surfaces within the resin, a concentration gradient is developed that drives the movement of ions within the resin. A high concentration of carbonate or bicarbonate ions on the surface and a low concentration within the resin causes the carbonate to migrate inwards while at the same time the opposite concentration gradient is also propelling $OH^-$ anion from the interior of the resin to migrate to the surface. Each gradient aids the other and has shown to produce sufficient rates as not to significantly hinder gas absorption kinetics.
5. Water loss: An often very important factor that generally has not been considered when looking at collectors is the water loss that is associated with aqueous solution based contactors. Generally, water loss is anywhere from 10-100 times the amount of $CO_2$ collected or possibly greater. Given the dry operation of a functionalized solid surface collector, water loss is dramatically reduced.
6. pH Control: By decreasing the amount of water of hydration through cross linking, the effective pH of the solid can be better controlled. Further, by increasing the relative density of $OH^-$ groups on the solid, pH also can be controlled.

Based on a series of experiments it has become clear that nearly dry resins with no visible liquid adhering to them can absorb substantial amounts of $CO_2$ and reach a loading state where there is effectively one $CO_2$ molecule per amine site. A wet resin cannot hold more than one $CO_2$ molecule per two amine sites. In the former case the resin reached a carbonation state that is equivalent to a bicarbonate salt, whereas in the latter case the equivalent salt is a carbonate. Data also suggest that the reaction kinetics in the dry case does not change dramatically as the system moves from a partial loading that is less than that of a carbonate to a loading that substantially exceeds that of a carbonate. This is compatible with a system in which carbonate ions and bicarbonate ions co-exist.

As a consequence of this chemistry it is possible to absorb significant amounts of $CO_2$ from air (either ambient outside air, or indoor air) and drive a substantial amount of $CO_2$ from the sorbent resin simply by exposing it to increased amounts of water, either in the form of liquid or in the form of water vapor.

It is therefore possible to induce the release of $CO_2$ from the solid sorbent and recapture it in a nearby liquid sorbent that can remove $CO_2$ at this partial pressure from a gas stream. We will refer to this effect as a water swing, when the wetting of the ion exchange material is performed with liquid water and as a humidity swing when the wetting is performed with an increase in the partial pressure of water vapor.

If the resin is exposed to pure liquid water, the capacity of the water to hold the released $CO_2$ is very limited and most of the $CO_2$ will collect in the gas phase adjacent to the water film that wets the material. Experiments have shown that the partial pressure of $CO_2$ over such liquid wetted ion exchange resins can exceed 50 mbar in pressure. However, it is possible to include a base in the water and thus have the $CO_2$ contained in the solution rather than have it exhaled into the surrounding gas space. This is the basis of our carbonate wash of the ion exchange resin. The water in the solution induces the resin to release excess $CO_2$ and the released $CO_2$ converts the solution from a carbonate solution into a bicarbonate solution. This bicarbonate brine can then be further processed to release its $CO_2$ and be reconverted into a carbonate solution that is ready for washing the next resin that has been partially or fully loaded with $CO_2$.

One approach to the separation of $CO_2$ from the bicarbonate is to use an electrodialytic cell stack that is designed to split the salt (here the bicarbonate, for example sodium bicarbonate) into the base (here a carbonate, for example sodium carbonate) and an acid (here carbonic acid, which will disintegrate into a $H_2O$ and $CO_2$ and thus release the $CO_2$. In the case of a weak acid like $CO_2$ it is possible to operate the salt splitter with only a cationic membrane, that transfers the cations (for example sodium ions) from the acid chamber to the base chamber, without having to create a dilute salt stream in the middle. In such a design there is a sequence of stacks comprising bipolar and cationic membranes. Figure X shows a specific implementation of such a design that has been operated on such a salt splitter.

There are other method of recovery of the $CO_2$ from the bicarbonate solution and regeneration of the carbonate solution. First there are a number of variations on the electrochemical separation. For example, it is also possible to utilize a conventional salt-splitter utilizing a sequence of bipolar, cationic, anionic membranes. In this case the salt solution is diluted and returned as a dilute stream of water. It is also possible to utilize a stack in which the stack is a sequence of bipolar and anionic membranes. In this case it is not the cation but the bicarbonate ion that travels across the membrane.

Not all of recovery schemes are electrochemical in nature. It is possible to heat the solution and thus induce the release of $CO_2$; it is possible to cool the solution and thus promote the precipitation of sodium bicarbonate which is less soluble than sodium carbonate and then in a subsequent step the solid sodium bicarbonate is calcined to $CO_2$, steam and sodium carbonate.

Rather than using an inorganic brine solution it is also possible to use amine solutions to capture the $CO_2$ that is released from the membrane. In this case it is important to assure the chemical compatibility of the resin and the amine solution as it is possible for the resin to be destroyed by the organic amine in the solution. In that case too, one can use recovery techniques that are specifically designed to work for liquid amines. The use of weak amines is made easier or very weakly alkaline brines is aided by the fact that the $CO_2$ release is driven by the presence of water.

In general the recovery of $CO_2$ from a strong base ion exchange resin is greatly aided by the fact that the $CO_2$ release is driven by the presence of water in liquid or vapor form. If the water has little alkalinity the released $CO_2$ is released from the water into the surrounding gas space where it can be recovered by subsequent processing steps. A process that uses water vapor rather than liquid water to wet the resin surfaces, has the additional advantage that one can use saltwater or otherwise contaminated water for creating the humidity swing. Not only is the water loss in the subsequent drying of the resin reduced, from an economic point of view the use of salt water or other forms of so called grey water have the advantage that the cost of water use is reduced.

In the case of a water vapor induced swing, the $CO_2$ will be released into the gas space and thus it needs to be collected from there by other methods. There are several options for such a recovery. The first is to use a secondary sorbent that can be chosen from a wide range of options. It is advantageous to use a sorbent that binds the $CO_2$ more weakly than the dry resin does. This is in general possible, because the presence of water in liquid or vapor form substantially raises the equilibrium partial pressure of $CO_2$ and hence reduce the minimum required binding energy of the second sorbent. Based on experimental information the water or humidity swing makes to have the second sorbent operate at a partial pressure of $CO_2$ that could well exceed 50 milibars. Second sorbents that need not be in direct contact with the resins can include but are not limited to another resin, for example a weak base resin, a liquid amine solution, an alkaline brine with or without partial carbonate and/or bicarbonate loading, activated carbon beds', zeolite beds, etc.

To address the needs described above, the present disclosure describes a method and apparatus in several embodiments using a process for the capture of carbon dioxide ($CO_2$).

In one aspect, the present invention which in one set of implementations comprises bringing a gas stream which contains $CO_2$ in contact with a resin in order to fully or partially load it with $CO_2$, wetting the resin with liquid water or water vapor in order to induce a partial release of the absorbed $CO_2$, collecting water vapor and carbon dioxide from the resin to extract the $CO_2$ from the gas stream, and separating the carbon dioxide from the water vapor by one of several methods. In another set of implementations the wetting is performed with an alkaline washing solution that acts as a $CO_2$ sorbent, wherein the water in the solution stimulates a release of $CO_2$ from the resin which is then absorbed or contained by the alkalinity present in the washing solution.

The present invention provides several substrate materials that improve the efficiency of the capture of the carbon dioxide on the resin, and release of the carbon dioxide into the water. Carbonic anhydrase may be added to the water to aid and accelerate the process. The resin may alternatively be wetted by humid air or by steam or by liquid water. Experiments have shown that it is not necessary to create liquid covered surfaces. In one embodiment, the process is contained in an upright tower assembly.

In another aspect, the process of the present invention may include the use of secondary sorbents, such as weak liquid amine or hydrophobic activated carbon, to aid in sequestering the $CO_2$ and separating the water vapor. For secondary sorbents that are not fouling or otherwise disabling the primary sorbent resin, it is possible to wash the $CO_2$ directly off the resin.

The present invention also provides a process in which an ion-exchange resin is placed in a plurality of chambers connected in series wherein said first chamber contains resin that was most recently saturated with carbon dioxide from the gas stream, and each successive chamber contains resin which has been wetted and carbon dioxide collected from for a greater period of time than the previous chamber, and so on until the last chamber. The plurality of chambers are connected by a plurality of valves that allow any of the plurality of chambers to serve as said first chamber.

Another aspect of the present invention includes collector geometries that will allow change between large pore spaces for solid-gas exchange and smaller pore spaces for solid-steam and solid-liquid exchange. The change will be achieved by either adjusting the pore size or by using structures that have more than one pore size. It also includes fixed pore size systems.

In yet another aspect, the present invention comprises a process for capturing $CO_2$, wherein the functionalized medium is washed with a basic solution, creating an effluent with a high carbonate or bicarbonate concentration. The effluent may then be supplied, e.g., to an electrodialysis cell, which releases the $CO_2$.

Further features and advantages of the present invention will be seen from the following detailed description, taken in conjunction with the accompanying drawings, wherein FIG. 1 is an illustration of an ion exchange process in accordance with the prior art;

FIGS. 11A and 11B are drawings showing a collapsible collector in accordance with one embodiment of the present invention;

FIGS. 12A-12F are drawings showing the fixed geometry of a collector in accordance with other embodiments of the present invention;

Figure 1:
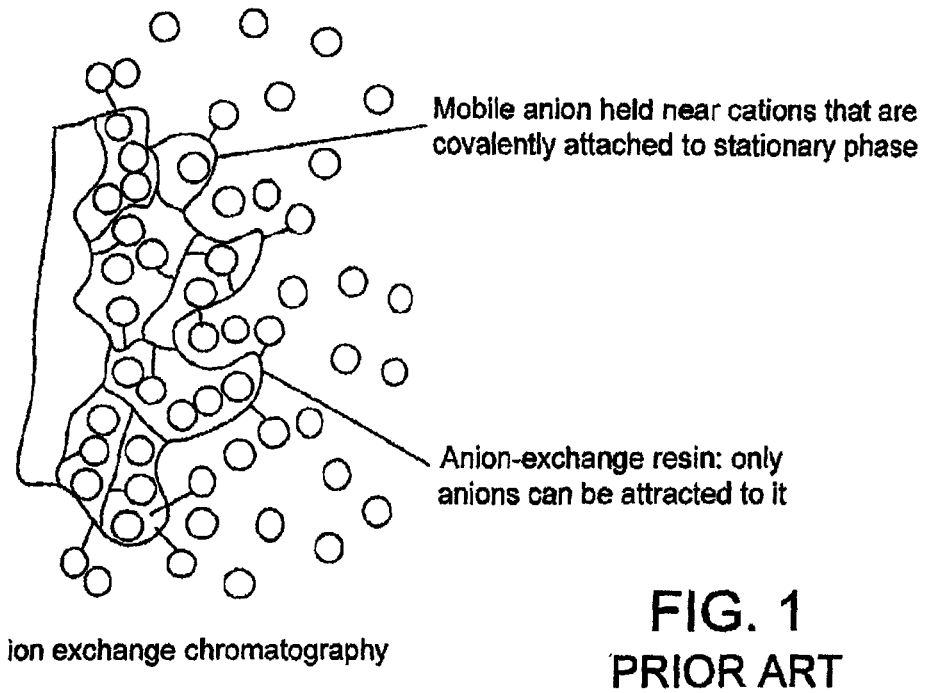
Figure 2:
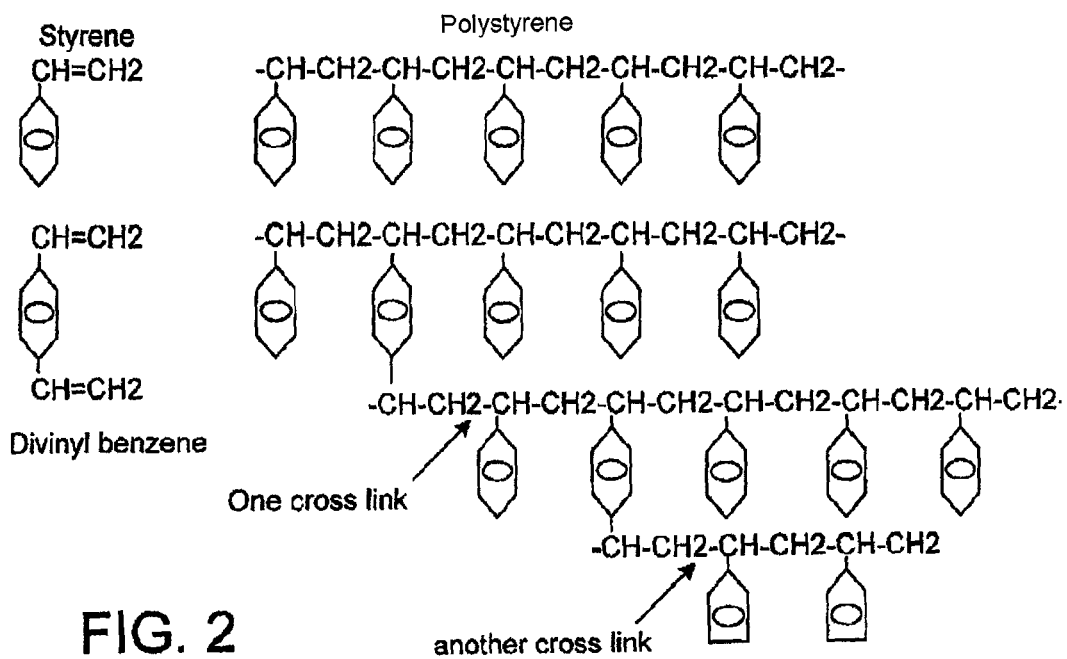
FIG. 2 is a schematic showing the covalent bonds in an ion exchange resin in accordance with the prior art.

This invention is based on utilization of a swing in $CO_2$ equilibrium pressure with changing moisture levels, with changing temperature and with changing pressure. The combination of these changes offers a number of approaches to the recovery of $CO_2$ from the air exposed resin. The apparatus described in this disclosure is capable of removing carbon dioxide from ambient air under a wide range of conditions, it is also capable of removing carbon dioxide from other gas mixtures. While the implementation is preferable for use with low concentrations of $CO_2$ (i.e., less than 1%), it is also possible to collect carbon dioxide from gas mixtures that are rich in $CO_2$ ranging from 1% to 98%.

We have found that dry ion exchange resin exposed to ambient air can absorb $CO_2$ and after some time reach an equilibrium loading that is balanced with the $CO_2$ partial pressure in air. Rather than air one can also use similar gas mixtures with low partial pressures of $CO_2$ ranging from 1 to 200,000 ppm. In the case that the resin has been exposed to ambient air with about 400 ppm of $CO_2$ in the mixture, it is possible to wet the air exposed resin material and retrieve $CO_2$ at a partial pressure of e.g., 80,000 ppm or more. Hence the presence of humidity has greatly increased the equilibrium partial pressure of $CO_2$ over the resin. As a result one can wash the resin in water and captures the $CO_2$ from the gas that is in contact with the water. Alternatively, it is possible to capture the $CO_2$ from an aqueous solution that absorbs the $CO_2$ because it has the necessary alkalinity to bind the $CO_2$ that has been freed from the resin. The alkalinity can be provided in the form of hydroxide solutions (e.g. NaOH, or KOH), it can be provided in the form of carbonate solutions, e.g. $Na_2CO_3$, $K_2CO_3$, or even mixtures of carbonate and bicarbonate solutions, that have less of bicarbonate loading than is possible to achieve in contact with the air exposed resin.

We have also shown in experiments that it is sufficient to expose the ion exchange resins to increased levels of humidity rather than directly expose them to liquid water and effect a substantial release of $CO_2$ from the resin. Experiments have shown that the equilibrium partial pressure of $CO_2$ over resin that has been equilibrated in its $CO_2$ loading against ambient air is approximately a function of the absolute humidity rather than the relative humidity over the system. In effect the partial pressure of $CO_2$ over resin does not change much with a range of temperatures, but it is very sensitive to a change in the absolute humidity of the gas it is in contact with.

Experiments have also shown that the exposure to water vapor pressure can stimulate the release of $CO_2$ from the resin even in the absence of the other constituents of air, as for example oxygen and nitrogen. In one aspect of the invention we therefore fill the resin material in a cartridge or otherwise put it into a chamber that can be evacuated prior to exposing its content to water vapor and/or liquid water.

In one aspect of our invention we expose the resin to air in a variety of geometries and designs. After the resin has been saturated or partially saturated with $CO_2$ from air and thus is in equilibrium with a partial pressure of $CO_2$ which is less than 400 ppm, we release the $CO_2$ into a gas space in which the partial pressure of $CO_2$ can reach 50,000 microbar or more.

In some of our earlier patent applications we describe use of Type 1 and Type 2 strong-base resin-functionalized with tertiary and quaternary amines for absorbing $CO_2$ from air. As described therein, $CO_2$ is extracted and stored on the resin as a carbonate or bicarbonate. More particularly, as described in U.S. patent application Ser. No. 11/866,326, a remarkable feature of these strong-base resins is that they absorb far more $CO_2$ when they are dry than when they are wet. While the performance depends on the humidity in the air, the temperature of the resin and the state of $CO_2$ loading of the resin, we have found that the equilibrium partial pressure over a wet resin is roughly 200 times larger than over a dry resin with similar $CO_2$ loading. For example, we have found a resin that in its dry state has been exposed to ambient dry air, after exposure to water can fill a small air space with a partial pressure of $CO_2$ that exceeds 60 mbar (60,000 microbar). A resin that is in equilibrium with a sodium carbonate/bicarbonate solution that in turn is in equilibrium with the $CO_2$ in air binds only slightly more than one carbon atom, as a carbonate or bicarbonate ion, for every two positive charges attached to the surface of the resin. On the other hand if the resin is equilibrated with air of low humidity in the absence of liquid water, the number of carbon ions that are bound per attached ion approaches one. This property of the resin can be used to achieve a humidity induced pressure swing for capturing and collecting carbon dioxide.

As the humidity in the air increases, the equilibrium partial pressure of $CO_2$ over the matrix rises drastically. For example, we have tested a sample of 6 g of resin of anion exchange membrane material available from SnowPure, LLC, of San Clemente[1]. The membrane was slit into noodle-like strands 1 mm thick by 1 mm wide. An amount of this material that at 3 ppt of water in the atmosphere at room temperature is in equilibrium with 40 ppm of $CO_2$ can raise the $CO_2$ partial pressure in the a 20 liter bell jar to above 1200 ppm when the water vapor content of the air is raised to 30 ppt. And, a membrane material of 10 g that had been made to release roughly 100 cc of $CO_2$, absorbed another 100 cc of $CO_2$ after drying, and then in the first cycle of $CO_2$ release after wetting, drove the $CO_2$ content of the bell jar to 3700 ppm. Thus, it appears that the drying resin material rearranges itself, accommodating bicarbonate ions rather than just carbonate ions. Because of this pronounced swing in carbon capacity, it is sufficient to raise the humidity over the resin to force the resin to release $CO_2$ that has been absorbed.

[1] The manufacturer describes its material as comprising crushed anionic exchange resin mixed in a polypropylene matrix and extruded as a sheet according to the teachings of U.S. Pat. Nos. 6,503,957 and 6,716,888.

While not wishing to be bound by theory, it is believed that the resin as it dries out rearranges itself at least in part to favor accommodation of bicarbonate ions rather than carbonate ions. However, we have observed that the $CO_2$ uptake rate gradually declines as the loading increases. There is no sharp boundary between the carbonate/hydroxide and the carbonate/bicarbonate regime for dry resins, suggesting that the uptake mechanism does not change as the system transits from one with residual hydroxides to one with residual carbonate ions. One possible explanation is that in a more or less dry system, carbonate ions can disassociate into bicarbonate ions and hydroxide ions, even though in aqueous solution the equilibrium of this reaction greatly favors carbonates over bicarbonates. One possible way of looking at this is that bicarbonate will precipitate on the resin surface touch earlier than carbonate ions and thus they could remove some of the carbonate from the solution in the form of bicarbonates. In any event the effective pH of the surface seems higher than it would be based on the level of carbonation in an aqueous system.

Figure 3:
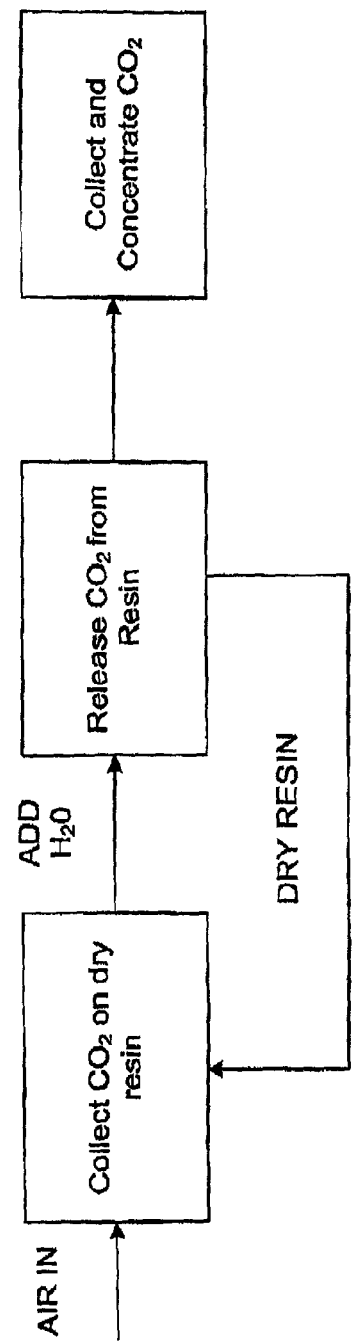
FIG. 3 is a schematic showing an ion exchange process for capturing $CO_2$ in accordance with the present invention wherein water is added to release the $CO_2$ from the resin.

Because of this pronounced swing in carbon dioxide storage capacity, it is in principle sufficient to raise the humidity over the resin to force the resin to release $CO_2$ that has been absorbed. One possibility is to immerse the resin in water, in order to release the $CO_2$. This process is shown in FIG. 3. A short wetting of the material by itself may not be sufficient to release the bulk of the bound $CO_2$. The $CO_2$ release from the material persists for a long duration but does release a large fraction of the $CO_2$ that can be bound to the resin surface. Another embodiment of the present invention is to expose wetted resin to air, as opposed to immersing the resin for the duration of the $CO_2$ release. Because time is the major constraint on this design, it is recommended that the apparatus be relatively large and allow the outgassing of the volume for an extended amount of time.

Operating in a near vacuum, where the nitrogen and oxygen of the air have in effect been removed from the system, does not slow the kinetics of the process down. Thus it is possible to generate a gas stream from the wetted resin material that is a mixture of water vapor and $CO_2$ that has been released from the resin. The partial pressure of the latter may be as high as 60 millibar. The partial pressure of the former will depend on temperature but should be about 30 millibar or less. The containment of the system should be constructed in a way to throttle the flow so that the slow release of $CO_2$ can continue while keeping the system near equilibrium conditions. If the $CO_2$ is evacuated too quickly, the rapid water vapor production kinetics will change the ratio of $CO_2$ released to water vapor release in favor of excess water release. This would cool the system, requiring additional heat input. If water were caught in a condensation trap the energy for cooling would grow rapidly. Thus it is important to stay near the equilibrium point, which sets the maximum acceptable flow rate.

Under dry atmospheric conditions, $CO_2$ is collected from the air. Once the resin reaches a high level of saturation, in which it is essentially transformed from its carbonate form to a saturated bicarbonate form, the resin material is packed into a chamber, which is first evacuated and then filled with water vapor and with liquid water which is agitated to the point that all resin surfaces are thoroughly wetted. Alternatively, the resin may be contacted with water vapors only. However, the rate of $CO_2$ release from a resin is much higher when the resin is wet than when it is just exposed to water vapors. Indeed, not only does the rate of release increase, the partial pressure $CO_2$ also goes up. We have found that it may be useful to add small amounts of carbonic anhydrase to the water in order to improve the reaction kinetics of the $CO_2$ transferring from the resin to the water and on to the surrounding gas space. In some designs it may be advantageous to begin by collecting the $CO_2$ loaded resin material in a container that is first evacuated to remove excess air. Then the resin is wetted so that is releases $CO_2$. This leads to 50 mbar of $CO_2$ in the chamber, added to this would be around 20 to 30 mbar of $H_2O$. It is possible to change the water content by raising and lowering the temperature in the system.

It is now possible to pump the produced gas out of the system, as the gas is compressed the water in the gas will condense out, while the $CO_2$ becomes more and more compressed. Ultimately we can drive the pressure to $CO_2$ pipeline pressure. If desired, the $CO_2$ may be dried before bottling or sending it to the customer.

Even though wetting the resin material allows for the release of $CO_2$ from the resin, this release is relatively slow. A short wetting of the material by itself is not sufficient to release the bulk of the bound $CO_2$. However, we have found that the $CO_2$ release from the material persists for a long time but it involves a large fraction of the $CO_2$ that can be bound to the resin surface.

In an experiment performed with 6 g of membrane material cut into strips, and after 15 minutes of washing the resin in DI water, the resin would still exhale $CO_2$ and raise the $CO_2$ level in a closed bell container system to about 1200 ppm. Left alone over night, but allowed to dry, the resin recaptured all this $CO_2$ and then some, reducing the $CO_2$ level in the bell container to about 40 ppm. Raising the humidity in the bell container to 30 ppm lead to $CO_2$ exhalation that reached above 1400 ppm. Releasing this $CO_2$ and washing the resin strands in DI water, would lead to a much more rapid release of $CO_2$ that raised the pressure in the bell to about 1800 ppm. A second experiment yielded well over 1100 ppm and a third still reached 700 ppm. In total the system exhaled at least 1000+1400+500+300~3300 ppm. This translates into roughly 66 cc of $CO_2$ or about ⅔ of the $CO_2$ capacity that was initially collected by the carbonate washed membrane. The total capacity of the membrane material should be around 6 millimole or about 120 cc. As a result, it is believed that pure water alone can cause a large swing in $CO_2$ binding to the matrix. It is not clear how much $CO_2$ has been released from the matrix during the wash cycle outside of the bell jar. While the system spent several minutes in the water a substantial amount of additional $CO_2$ could have been removed. The data toward the end of the run suggest that the rate of $CO_2$ released dropped somewhat during the wash cycle, suggesting that the wash cycle has removed additional $CO_2$ at a somewhat faster rate. However, the total amount of $CO_2$ that has been removed during the wash cycle is bound to be relatively small considering how much has been emitted in the quiet periods in between.

The rate of decarbonization of the membrane material while it is in the water was not measured. However, it was observed that carbonic anhydrase had little effect on the rate of $CO_2$ release from the wet membrane which suggests that the slow step in the process is the release of the $CO_2$ from the membrane.

Figure 4:
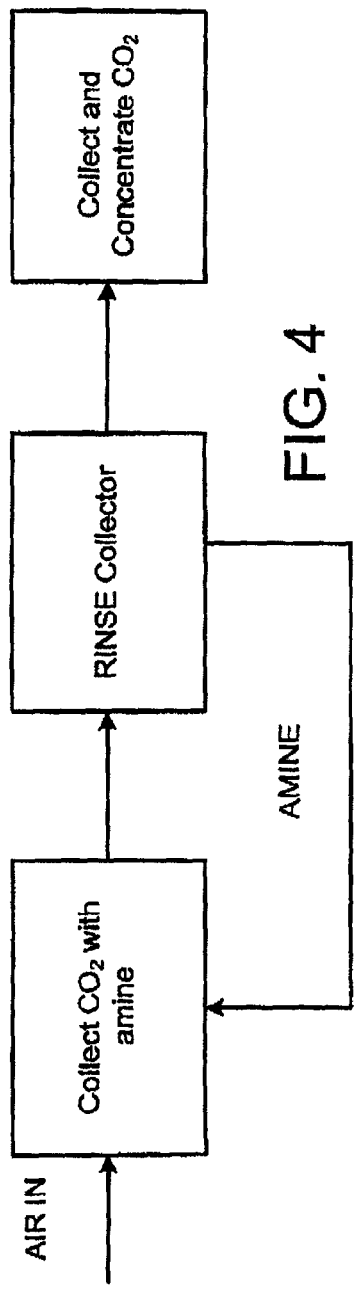
FIG. 4 is a schematic showing a process employing weak liquid amine for capturing $CO_2$ in accordance with the present invention.

Alternatively, as illustrated in FIG. 4, we can extract the $CO_2$ from the gas stream using other schemes of separation, such as a weak liquid amine for a secondary absorption step. This amine must be capable of pulling the $CO_2$ content of gas mixture down so that the $CO_2$ partial pressure drops to about e.g., 20 to 30 mbar. Thus it can be far weaker sorbent than the primary resin we are using for the capture of $CO_2$, and this allows us to use very weak amines, or weak amine based resins. In the case that the resin is damaged by the resin wash, it is possible to let the amine rinse flow over other surfaces which due to being wetted by the resin can absorb a substantial amount of CO2.

In yet another embodiment of the invention we could use the same type of resin as on the air capture device, but operate on a different level of the loading curve. This resin would stay moist and would be subject to a thermal swing for removal of $CO_2$.

While a high level of water vapor or moisture in the air should be sufficient for $CO_2$ release, we could use liquid water in the $CO_2$ release. However, the use of water vapor rather than liquid water could reduce wear and tear on the resin. It also makes it possible to use water that contains salts or other impurities.

It is usually advantageous to remove excess water vapor from the $CO_2$ water vapor mixture by pressurizing the gas so that the water vapor will become supersaturated and condense out. However, it is possible to remove the water by using a cold trap, which then in principle could be followed by a second cold trap for $CO_2$. This method is of particular interest if the water condensation can at least be partially accomplished by cooling the heated resin back to lower ambient temperatures. If the apparatus initially worked with grey water or salt water, the water condensation could provide a separate stream of clean water that could be tapped as a byproduct.

There are ways of reducing water consumption. For example one could send short pulses of steam through the resin, controlling the pulses to be too short for the steam to enter deeply in the resin, but sufficient to release a pulse of $CO_2$ from the resin surface. Later on, diffusion inside the resin will redistribute the loading internal to the resin and the steam pulse could be repeated several times until the overall $CO_2$ content has dropped sufficiently.

A large fraction of the $CO_2$ that has been collected on a dry resin can be removed again by exposing the dry resin either to water saturated air, or by immersion into liquid water. Particularly in an implementation that relies on a water swing the wear and tear pn the material is small, and the material can be cycled many times through this water swing. The amplitude of the swing may involve as much as half of the $CO_2$ carrying capacity of the resin but practical designs may aim for slightly lower swings in loading.

Using rough numbers for the membrane the rate of exhalation is about 1 milimole of $CO_2$ for a 10 g sample in 15 minutes, or about 1e-4 milimole/g/sec. Since for the material we used the macroscopic surface area is about 40 $cm^2/g$ we have a release rate of 2.5e-5 $mole/m^2/sec$. Uptake rates are comparable, although usually a little slower. It also means that a 50 g sample will produce about 0.1 cc/sec or about 100 cc of gas in about 15 minutes.

Based on theory the kinetics of the progress are not slowed down by operating in a near vacuum where the nitrogen and oxygen of the air have in effect been removed from the system. Experiments have confirmed this observation. Under low pressure conditions it is possible to generate a gas stream from the wetted resin material that is essentially a mixture of water vapor in equilibrium with the temperature in the chamber, and $CO_2$ that is being released from the resin. The $CO_2$ pressure in the chamber could be as high as 60 millibar, but drops rapidly as the loading of the resin with $CO_2$ is reduced. At room temperature partial pressure of water vapor are around 30 millibar. It is possible to raise the partial pressure of water vapor in the chamber by raising the temperature. This in effect creates a hybrid system that combines a humidity/water swing with a temperature swing. In a system that has been heated, one can reduce the water vapor pressure by cooling the output stream against ambient temperatures. This will reduce the water vapor concentration in the chamber down to the equilibrium pressure at the ambient temperature.

Because it takes a long time for the $CO_2$ release from the resin to reach equilibrium with the surrounding gas, the containment of the system should be constructed in a way to throttle the flow so that the slow release of $CO_2$ can keep the system near $CO_2$ partial equilibrium conditions. If the flow is allowed to move too fast then the rapid water vapor production kinetics will change the ratio of $CO_2$ released to water vapor release in favor of excess water release. This would unnecessarily cool the system and thus would require additional heat input. If the water were to be removed in a condensation trap, the energy demand for cooling the gas stream would grow rapidly if the ratio of water vapor to $CO_2$ in the gas mix turns unfavorable. A suitable mix of $CO_2$ to water may have a ratio of 1:1. Thus it is preferred to maintain the system near the equilibrium point, which sets a maximum flow rate that is acceptable.

Water can be removed by several ways from this low pressure mixture. The first is to cool the gas to condense the water out. As long as the temperature of the system is above ambient this incurs no practical energy penalty, but the penalty is severe if condensation is to occur under sub-ambient conditions. One way of avoiding this is to compress the $H_2O/CO_2$ gas mixture. As the partial pressure of $H_2O$ rises it will force condensation at temperatures above ambient conditions and thus it is possible to remove water with an extremely small energy penalty. Indeed in one set of implementations one can force condensations at temperatures above the (elevated) operating temperature of the chamber and thus provide a substantial fraction of the heat demand from the heat of condensation. In effect the system is run with an efficient heat pump that transfers heat of condensation into the system at elevated temperatures.

Figure 5:
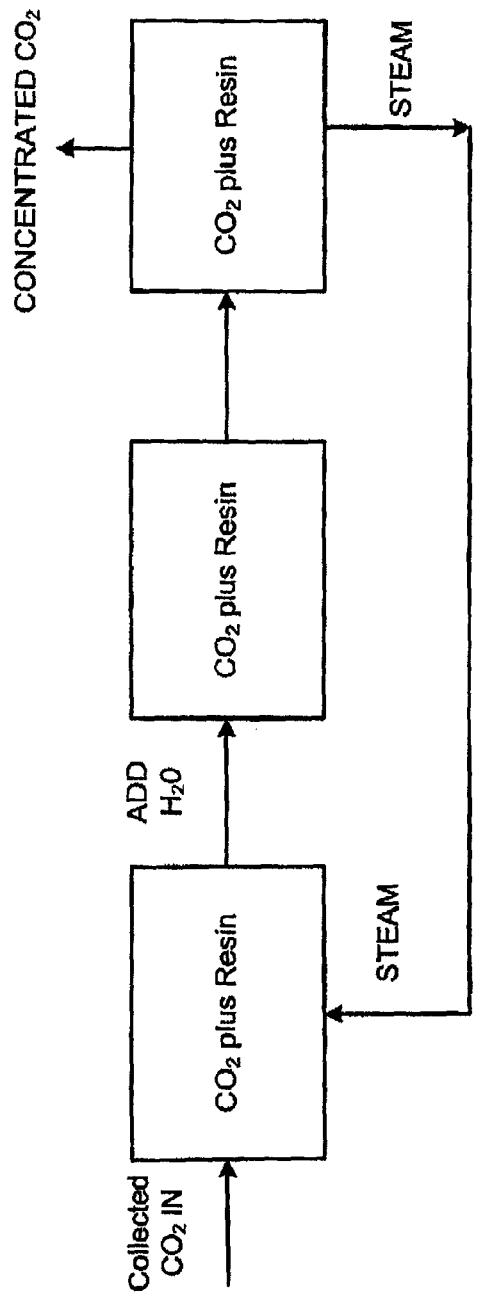
FIG. 5 is a schematic showing an ion exchange process for capturing $CO_2$ in accordance with one embodiment of present invention wherein multiple chambers are used in succession.

Based on these conditions, we have designed a water (or humidity) swing system, where under dry conditions, $CO_2$ is collected from the air. Based on experiments, it appears that the humidity level is mainly characterized by the absolute humidity and not the relative humidity. This is based on the observation that at constant absolute humidity, the $CO_2$ level in a closed bell jar, where air is in contact with a resin, would not change as the temperature moves from near the dew point to much higher temperatures e.g. 10 to 20° C. higher. A change in humidity, on the other hand, would cause a large swing in the $CO_2$ equilibrium level. This result suggests that a wet dry cycle is also possible in a moist/cool climate as well as a desert climate. Once the resin reaches a high level of saturation, which in a dry climate means it is essentially transferred from its carbonate form to a fully bicarbonated form, the resin material is packed into a chamber, which is first evacuated and then filled with water vapor and/or with liquid water which is agitated to the point that all resin surfaces are thoroughly wetted. The system then releases $CO_2$ and, given enough material in the chamber, the system can reach a $CO_2$ pressure that exceeds that of the water vapor in the chamber. In order to build up such a high pressure of $CO_2$ (about 30 to 60 millibar) a chain of chambers may be provided, as in FIG. 5, that are saturated with water vapor near ambient conditions (about 30 mb of steam) but at varying temperatures so that the water saturation pressure drops from the upstream end (where steam is let in, to the downstream end, where $CO_2$ and steam are removed.) In this system gas flow is maintained because water vapor and $CO_2$ are extracted at the downstream end of the chain. The last chamber in the chain contains resin that has just returned from air saturation, which is capable of driving the partial pressure of $CO_2$ as high or even higher than the water vapor pressure. Higher upstream the chambers contain resins which have been exposed for longer times to the warm humid environment.

The chambers preferably will be nearly completely filled with resin material, since the larger the void space, the more difficult will it be to reach a high partial pressure of $CO_2$ in the system. The chambers could physically move in the chain, as new resin is added at the gas outflow end of the chain, and $CO_2$ depleted resin is removed at the other end. Rather than moving individual chambers, or cartridges that would fit into those chambers, we can also change the valving to the chambers. In this approach each chamber could be either connected to its downstream neighbor or the final extraction system. Each chamber would also be connected on the upstream side with the upstream neighbor or to the source of water vapor and sweep gas input. It is possible to valve out one unit, empty and refill it and valve it back in, so that it is now logically on the other end of the chain. In this way the resins can be moved through the chain without ever moving in location.

Unless the $CO_2$ is absorbed from the stream while leaving the water vapor unperturbed or unless both gas components are simply pumped out and compressed, the water vapor will have to be condensed out to be separated from the $CO_2$ stream. Condensation could occur at the downstream end of the chain or more likely in the intermediate chambers where the temperature drops from chamber to chamber leading to lower water vapor pressures as the gas flow proceeds. Condensation of the water vapor will produce a flow toward the low pressure end of the system.

Downstream from the last chamber, the $CO_2$ may be removed through condensation/sublimation at extremely low temperatures (between −80° and −100° C.) or with the help of compressor pumps which move the gas into another reservoir at higher pressure. Alternatively, the $CO_2$ may be removed by a sorbent, like cold liquid methanol, liquid amines, or sodium carbonate. Other options include hydrophobic versions of activated carbon.

Figure 6:
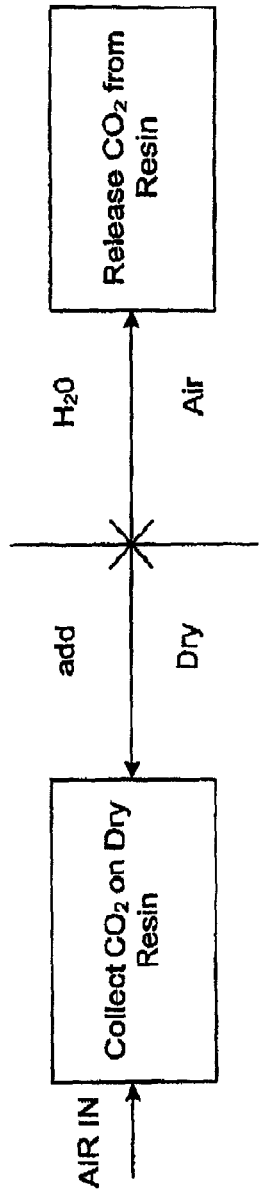
FIG. 6 is a schematic showing an ion exchange process for capturing $CO_2$ where valves are used to control flow between chambers in accordance with the present invention.

Referring to FIG. 6, in a single chamber with 6 g of SnowPure Anion Exchange material and after 15 minutes of washing the resin in DI water, the resin can still exhale $CO_2$ and raise the $CO_2$ level in the system to about 1200 ppm. Left alone over night, but allowed to dry, the resin recaptured all this $CO_2$ and more, reducing the $CO_2$ level in the container to about 40 ppm. Raising the humidity in the container to 30 ppm would lead to $CO_2$ exhalation that reached above 1400 ppm. Releasing this $CO_2$ and washing the resin strands in DI water leads to an even higher rate of release of $CO_2$, raising the pressure in the bell to about 1800 ppm. A second iteration still achieved well over 1100 ppm and a third iteration still reached 700 ppm. In total the system exhaled approximately 3300 ppm. This translates into roughly 66 cc of $CO_2$ or about ⅔ of the $CO_2$ capacity that was initially collected by the carbonate washed membrane. The total capacity of the membrane material is around 6 millimole or about 120 cc. As a result, it is believed that pure water alone can cause a large swing in $CO_2$ binding to the matrix. It is not clear how much $CO_2$ has been released from the matrix during the wash cycle outside of the bell jar measurement system. While the system spent several minutes in the water where a substantial amount of additional $CO_2$ could have been removed, the data obtained toward the end of the run suggested that the rate of $CO_2$ released dropped somewhat during the wash cycle, suggesting that the aqueous wash cycle has removed additional $CO_2$ at a somewhat faster rate. However, the total amount of $CO_2$ that has been removed during the wash cycle is bound to be relatively small considering how much has been emitted in the quiet periods in between.

Using rough numbers for the membrane, the rate of exhalation is about 1 millimole of $CO_2$ for a 10 g sample in 15 minutes, or about 1e-4 millimole/g/sec. For material having a macroscopic surface area of about 40 $cm^2/g$ we achieve a release rate of 2.5e-5 mole/m2/sec. Uptake rates are comparable, although usually a little slower. Experiments also show that a 50 g sample will produce about 0.1 cc/sec or about 100 cc of gas in about 15 minutes.

A design feature is that there are a number of chambers in this sequence. The resins in the different chambers have been exposed for different length of time to the outgassing process. Resins may move from chamber to chamber, or more likely the valving is changed to take a chamber from the purged end of the chain, remove its charge and fill it with a resin which is now put on the unpurged end of the chin. The gas in each chamber is composed of water vapor, $CO_2$ and possibly an inert sweep gas. The sum of the three partial pressures is monotonically declining from the upstream end of the system to the downstream end of the system. The sweep gas pressure can be reduced by increasing the flow speed, but the water vapor pressure is more or less in equilibrium with the liquid water at this point. The $CO_2$ pressure should increase in the direction of the sweep. If the water vapor is a large part of the total pressure, the water vapor pressure gradient controls the flow and it would be established by a temperature drop from one chamber to the next, while the $CO_2$ pressure will rise from one chamber to the next, as each chamber is adding some $CO_2$ to the flow. The contributions of each chamber will be limited by the rate at which the material can release $CO_2$ and the equilibrium pressure that particular resin can reach. The resin on the upstream end has been nearly exhausted of all its $CO_2$, thus adding very little to the total product; the last downstream unit can in principle add as much as 60 millibars. For this to happen the upstream end either has a steam pressure in excess of 70 millibars, or there is a substantial contribution of a sweep-gas that still would have to be separated from the $CO_2$.

One such sweep-gas that would be condensed out of the system might be methanol vapor, assuming that the last step of the system is a collection of $CO_2$ in cold methanol. The other alternative is to rely on water, in which case the upstream temperature of the water has to be large enough to generate a partial pressure of at least 60 milibars. As the steam moves from one chamber to the next it will encounter cooler temperatures and thus it will partially condense out, creating a pressure profile that drives a net gas flow from the low $CO_2$ end to the high $CO_2$ end of the system.

One implementation would condense out all remaining water and then pump away the $CO_2$. Other implementations would rely on $CO_2$ absorption and subsequent sorbent recovery. These sorbents could be cold methanol, liquid amines, or ammonia, or sodium carbonate. Other options include hydrophobic versions of activated carbon.

Figure 7:
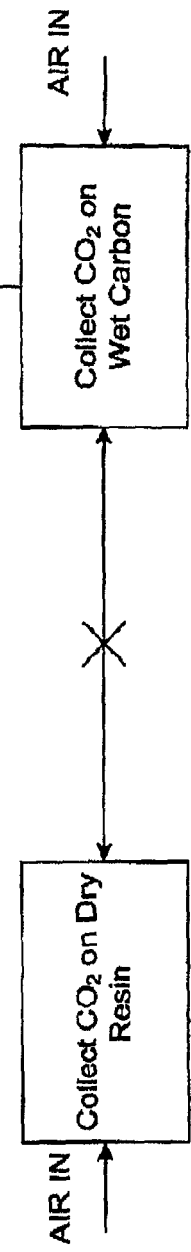
FIG. 7 is a schematic showing an ion exchange process for capturing $CO_2$ employing activated carbon in accordance with one embodiment of the present invention.

Yet another invention is illustrated in FIG. 7. This invention is based on observation that activated carbon has been observed to absorb $CO_2$ when wet, and release the absorbed $CO_2$ as it dries. This is the opposite behavior from ion exchange resins. Accordingly, this makes it possible to couple ion exchange resins and activated carbon in sequence. Starting with dry activated carbon and moistened resin materials air is passed through the system. As the air dries the resin, it transports the water vapor to the carbon. The resin picks up $CO_2$ as it dries, and the activated carbon picks up $CO_2$ as it accepts moisture. Once the resin is dry, the system is reversed, and fresh air is flowed through the activated carbon, and releases moisture back to the ion exchange resins. As the carbon dries it gives off $CO_2$, raising the $CO_2$ partial pressure where it can be concentrated and removed. A feature and advantage of coupling ion exchange material and activated carbon in this manner is that water is preserved, and is a simple matter of valving to reverse air flow.

The invention is susceptible to modification. For example, other materials such zeolite may be used in place of the activated carbon.

It is thus seen that using ion exchange resins, moisture swing can be used to separate and capture ambient $CO_2$. By stringing several air capture devices together, the ambient $CO_2$ removed may be concentrated.

Using ion exchange resins to remove $CO_2$ alone or in combination with activated carbon or zeolite in sequence, has the advantage that harsh chemicals such as sodium hydroxide typically used in $CO_2$ scrubbers in the past, can be avoided. Also, using humidity swing in the essentially closed systems, water is preserved.

Figure 8:
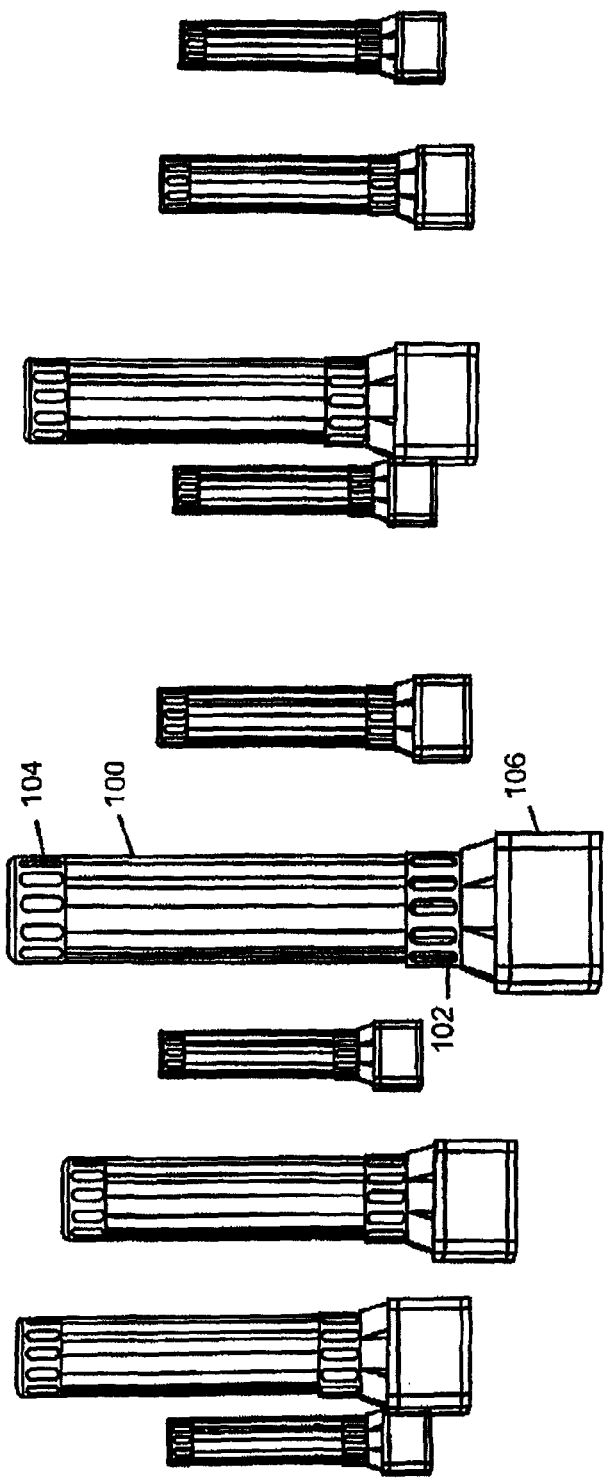
FIG. 8 is a drawing showing upright cylindrical towers in accordance with the present invention.

Referring to FIG. 8, a $CO_2$ air capture device could be comprised of a plurality of upright cylindrical towers 100 containing $CO_2$ capture material. Preferably, but not necessarily, the $CO_2$ capture material comprises humidity sensitive ion exchange material as previously described. Each tower 100 has a plurality of air inlets 102 adjacent the lower end thereof and a plurality of air outlets 104 adjacent a top end. Alternatively, the walls of the towers may be open to let air pass through at any level above the ground. Air is taken in the inlets 102 where it flows upwardly in the towers 100 in contact with the $CO_2$ capture material. Airflow may be by natural convective flow, or, if desired, powered by fans. Inlets 102 and outlets 104 may be selectively closed off by shutters (not seen) so that humidity within the towers may be raised and the captured $CO_2$ removed from the resin, and concentrated. Alternatively, the resin may be washed with liquid water to remove captured $CO_2$ which is concentrated in the base in which is also contained plumbing, and valving, etc., (not shown). Alternatively, the $CO_2$ capture material may comprise a wet sorbent such as an amine or carbonate or other $CO_2$ sorbent, which is pumped up and dribbled or flowed down a matrix material in the tower. In a preferred embodiment of the invention, several towers 100 are connected together underground where liquid effluent from the towers is processed to remove the $CO_2$, and the removed $CO_2$ is concentrated. Yet other changes are possible.

In another aspect of the present invention, the functionalized solid structure in the collector may be optimized for gas exchange, steam exchange, liquid exchange and mechanical performance. For gas exchange, the pore-spaces/tunnels will be large enough to keep the pressure drop low, minimize turbulence, and to prevent the boundary layer from increasing to a thickness that hinders $CO_2$ supply to the functional groups. Where the gas stream is ambient air, for example, if one liter of functionalized solid has one mol of exchange sites, it will take about 22.4 liters of pure $CO_2$ to saturate those sites with bicarbonate. If we consider an average uptake of 100 parts per million Volume (ppmV) of $CO_2$ per air volume, we will need to move 224,000 liters of air through one liter of solid to saturate the functional groups. This would require that the air flow is decreased as the solid saturates, since the $CO_2$ uptake decreases with saturation.

For steam and liquid exchange, the solid to void ratio typically is larger. For example, in commercially available water treatment systems, the typical ion exchange resin bed has an approximate void space of 30 to 40%. The beads are about 0.5 millimeters in size, leaving even smaller interstitial pore spaces. Therefore, for many applications, the collector should be a convertible structure with a primary and secondary porosity, which differ in size.

The design also includes a fixed power size system for cases where gas, steam, and liquid exchange use the same pore-size or when mechanical considerations favor a fixed power-space system.

In another aspect, the present invention provides improvements in the geometry of a collector that utilizes a functionalized solid collector medium to remove $CO_2$ from gas streams. The capture medium can for example consist of amine groups immobilized on/in a solid.

Figures 9A, 9B:
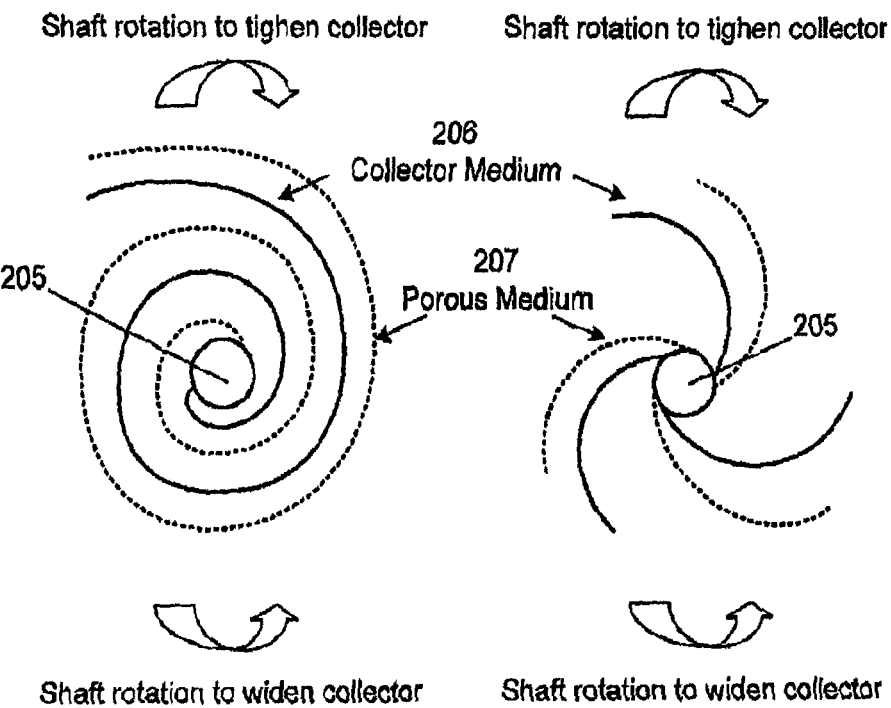
FIGS. 9A and 9B are drawings showing the roll geometry of an adjustable collector in accordance with one embodiment of the present invention.

Referring to FIGS. 9A and 9B, the present invention provides an adjustable-pore-size collector in roll-geometry, comprising an inert center shaft 205 with locking mechanism; inert mesh or other porous medium in sheet form 206; and functionalized collector medium in sheet form 207. One porous sheet and one collector medium sheet are fastened onto and wound around the shaft such that the innermost and the outermost layer of the roll consist of a porous sheet. This ensures that the collector medium is always sandwiched between porous sheets to allow contact with gas, steam or liquid on both sides of the collector medium sheet. Depending diameter of the roll, more than one membrane and porous layer are used, so that widening of the pore space requires less rotation by the center shaft. E.g. three layers require a third of the rotation of one layer.

The porous sheet provides the pathway for the gas, steam, and/or liquid stream. This flow path can be straight, spiraling, tortuous, laminar or turbulent design. The porous sheet also sets the minimum width of the pore space, which is achieved when the roll is tightened around the shaft. The pore space can be widened by turning the shaft against the direction of the coil or narrowed by turning the shaft in the direction of the coil. The shaft and porous sheet are manufactured from materials that are inert with regard to the gas, steam and liquid streams to which they are exposed.

Figures 10A, 10B:
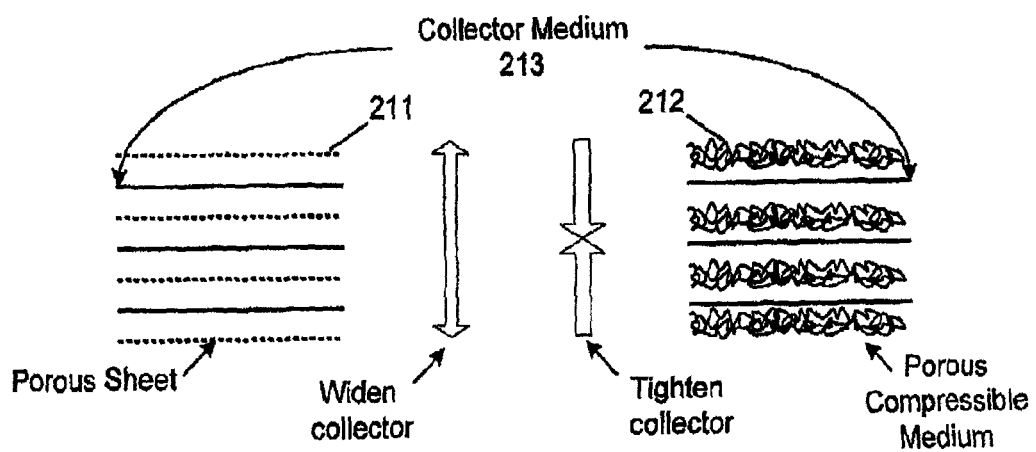
FIGS. 10A and 10B are drawings showing the flat sheet geometry of an adjustable collector in accordance with one embodiment of the present invention.

In an alternative embodiment, shown in FIGS. 10A and 10B, the present invention provides an adjustable-pore-size collector in flat-sheet geometry comprising inert mesh or other porous medium in sheet form 211 or as a compressible layer 212 and functionalized collector medium in sheet form 213. The flat-sheet geometry collector has alternating layers of mesh or other porous medium and collector medium. During fluid flow/exchange the layers are pressed together to achieve the smallest flow channel thickness between the collector medium sheets. The minimum thickness of the flow channel and the void space within this channel is determined by the porous medium that is used. During gas flow/exchange the flow channel can be adjusted to the optimum thickness by pulling the sheets apart. The optimum spacing is determined by the exchange rate of the collector medium and the liquid or gas stream, as well as the flow rate of the liquid and gas stream.

In another alternative embodiment shown in FIGS. 11A and 11B, the present invention provides a collapsible collector having a primary and a secondary porosity. The primary porosity is optimized for gas flow. The walls of the channels used for gas flow are constructed of the collector medium. The collector medium itself has a secondary porosity that is optimized for fluid flow. Once gas-exchange is complete and the collector medium is saturated with $CO_2$, the primary porosity is collapsed, leaving only the secondary porosity for steam or fluid exchange.

The simplest geometry for this collector is a series of medium collector sheets with open-cell pores. For gas exchange the sheets are spaced apart at a distance optimized for the $CO_2$ uptake rate of the collector medium and the length of the sheets. For steam and fluid exchange the sheets are pushed together and fluid flows through the porosity of the collector medium. Other geometries are shown in FIGS. 12A-12F, and include collapsible square or rectangular channels, etc.

The fixed collector will employ one or several fixed pore sizes. The pore geometry varies. Examples of pore geometry are round, square, rectangular, triangular, hexagonal, or differently shaped channels. The design also includes open cell foam geometry, or other irregular connected shapes determined by the form of the collector medium.

Figure 13:
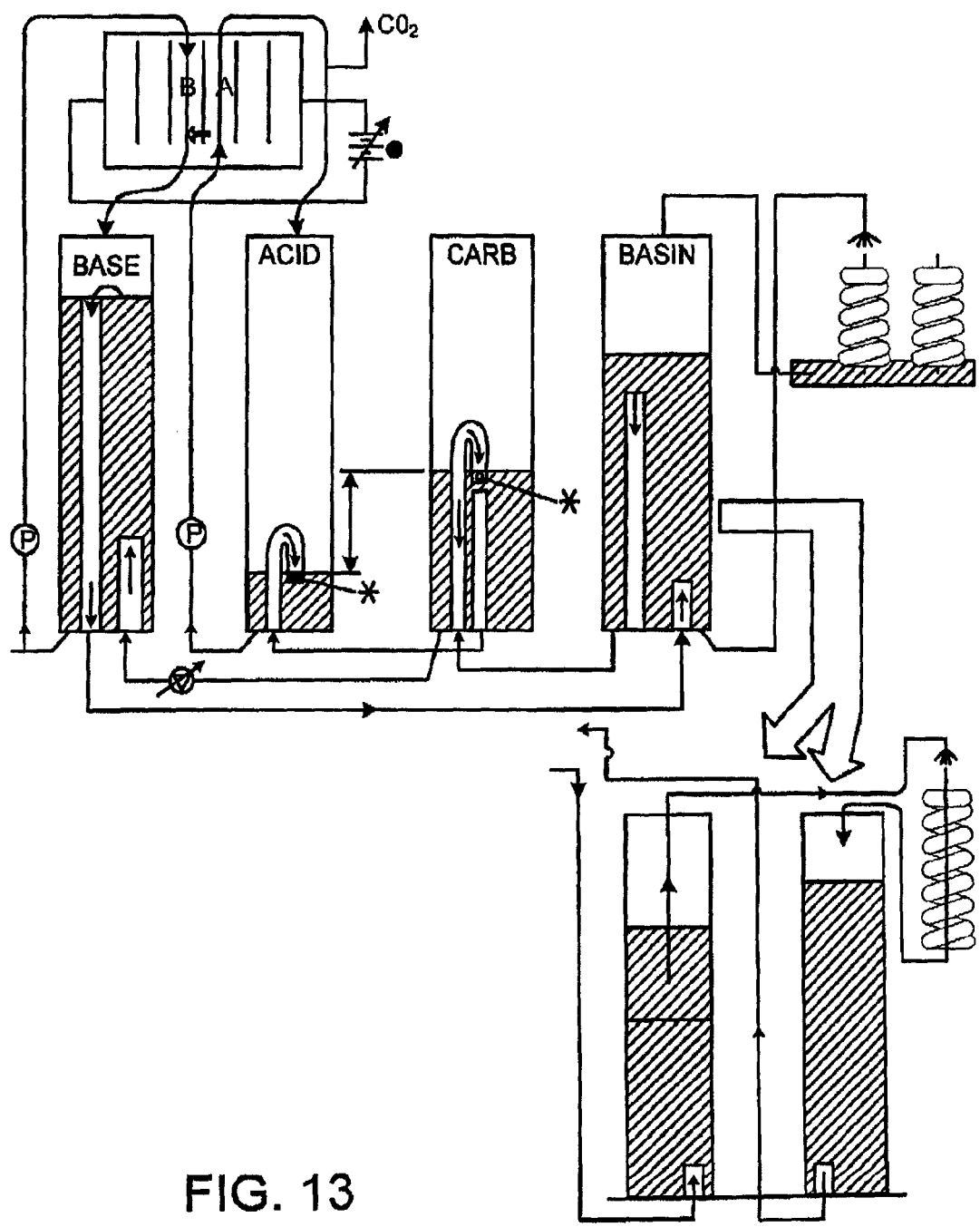
FIG. 13 is a schematic of an apparatus of the present invention having an electrodialysis cell according to one embodiment of the present invention.

In another aspect of the present invention shown in FIG. 13, the ion exchange process may be completed using an electrodialysis (ED) cell. The ion exchange resin may be washed using a basic solution, such as sodium carbonate ($Na_2CO_3$), preferably having a pH of 11-12. The resulting effluent, which in the example of a sodium carbonate wash will be primarily sodium bicarbonate ($NaHCO_3$), will preferably have a pH of 9-10.

The effluent is then supplied to the acid side of an ED cell, where the reaction is controlled through bipolar and cationic membranes. After an initial run, the acidic side of the cell stabilizes at a near neutral pH, at which point $CO_2$ evolves and is captured. Osmotic pressure drives water towards the base side of the cell. The basic solution is maintained near a pH of 12 and may also be used to replenish the wash fluid.

Because of the differences in pH and composition of the wash fluid and effluent, separate basins may be used for each.

Figure 14:
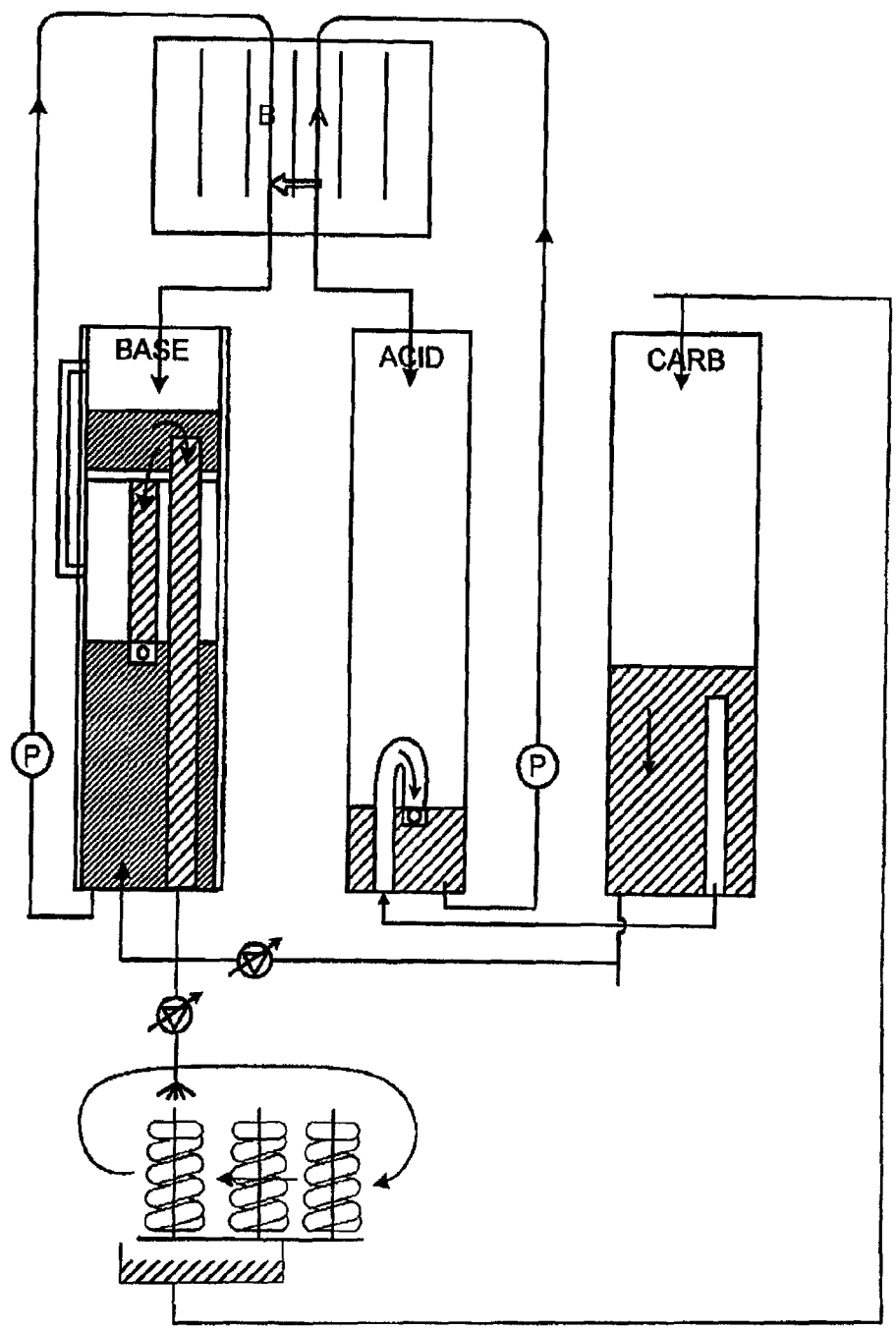
FIG. 14 is a schematic of an apparatus of the present invention having an electrodialysis cell according to an alternative embodiment of the present invention.

Alternatively, as shown in FIG. 14, the basic solution for the ED cell and the wash fluid may be contained in the same basin. This basin may contain a separator for separating two basic solutions having two distinct pH levels. In a preferred embodiment, the pH for the wash fluid is 12 and the pH for the basic solution supplied to the ED cell is 11. The effluent may be contained in a separate basin prior to entering the acid side of the ED cell. Also, the effluent, which preferably is at a pH of 9-10, may be used to dilute the portion of the basic solution to be used for the wash to a pH of 11.

It should be emphasized that the above-described embodiments of the present process, particularly, and "preferred" embodiments, are merely possible examples of implementations and merely set forth for a clear understanding of the principles of the invention. Many different embodiments of the processes described herein may be designed and/or fabricated without departing from the spirit and scope of the invention. All these and other such modifications and variations are intended to be included herein within the scope of this disclosure and protected by the following claims. Therefore the scope of the invention is not intended to be limited except as indicated in the appended claims.

The invention claimed is:

1. A method for removing carbon dioxide from a gas, comprising bringing said gas in contact with a resin in a chamber, evacuating said gas from the chamber, wetting said resin with a liquid, collecting liquid and carbon dioxide from said chamber, and separating said carbon dioxide from said liquid.

2. The method of claim 1, wherein the resin is wetted by immersion in a liquid.

3. The method of claim 2, wherein the liquid is water and also contains carbonic anhydrase.

4. The method of claim 1, wherein the liquid comprises a secondary sorbent.

5. The method of claim 4, wherein the secondary sorbent is a weak liquid amine.

6. The method of claim 4, wherein the carbon dioxide is released from the secondary sorbent upon an increase in temperature.

7. The method as recited in claim 1, wherein upon evacuating said gas stream, said chamber is at a near vacuum pressure.

8. The method as recited in claim 1, wherein a plurality of chambers comprising the resin are connected in series, and wherein the liquid enters the first chamber and exits through a last chamber, the carbon dioxide and liquid being collected from said last chamber.

9. A method for removing carbon dioxide from a gas, comprising bringing said gas in contact with a resin in a chamber, evacuating gas from the chamber, wetting said resin with liquid water, collecting liquid water and carbon dioxide from said resin, and separating said carbon dioxide from said liquid water.

10. The method of claim 9, wherein the resin is wetted by immersion in liquid water.

11. The method of claim 9, wherein the liquid water also contains carbonic anhydrase.

* * * * *